United States Patent [19]

Goddin, Jr. et al.

[11] Patent Number: 4,466,946
[45] Date of Patent: Aug. 21, 1984

[54] CO$_2$ REMOVAL FROM HIGH CO$_2$ CONTENT HYDROCARBON CONTAINING STREAMS

[75] Inventors: Clifton S. Goddin, Jr.; Edward A. Turek, both of Tulsa, Okla.; Boyd A. George, Lisle, Ill.

[73] Assignee: Standard Oil Company (Indiana), Chicago, Ill.

[21] Appl. No.: 357,362

[22] Filed: Mar. 12, 1982

[51] Int. Cl.$^3$ .............................................. B01D 53/34
[52] U.S. Cl. .................................... 423/228; 423/229; 423/245; 208/289; 208/290; 208/331; 208/342; 208/344; 55/16; 55/23; 62/17; 62/24
[58] Field of Search ............... 423/220, 226, 228, 229, 423/245; 208/189, 289, 290, 330, 331, 340, 342, 344; 55/16, 23; 62/24, 17

[56] References Cited

U.S. PATENT DOCUMENTS

| | | | |
|---|---|---|---|
| 2,720,265 | 10/1955 | Tracht | 208/340 X |
| 3,972,692 | 8/1976 | Machado et al. | 55/23 |
| 4,089,653 | 5/1978 | Ward | 423/232 X |
| 4,115,514 | 9/1978 | Ward | 423/232 |
| 4,130,403 | 12/1978 | Cooley et al. | 55/16 |
| 4,230,463 | 10/1980 | Henis et al. | 55/16 |
| 4,318,716 | 3/1982 | Doerges et al. | 423/229 X |
| 4,343,777 | 8/1982 | Dannhorn et al. | 423/228 |
| 4,372,925 | 2/1983 | Cornelisse | 423/228 X |

OTHER PUBLICATIONS

Sigmund et al., "The HS Process: An Advanced Process for Selective H$_2$S Removal", Gas Processors Association 60th Annual Convention, Mar. 25, 1981, San Antonio, Texas.
Goddin, "Comparison of Processes for Treating Gases with High CO$_2$ Content", Gas Processors Association 61st Annual Convention, Mar. 15–17, Dallas, Texas.
"Hindered Amines Boost Scrubber Absorbency", Chemical and Engineering News, Sep. 7, 1981, pp. 58 and 59.

Primary Examiner—Earl C. Thomas

[57] ABSTRACT

Carbon dioxide is removed from CO$_2$ and hydrocarbon containing gaseous streams. In the instance where the hydrocarbons and CO$_2$ are such that hydrocarbons would condense out during CO$_2$ removal, the gas stream is treated in one or more stages to accomplish hydrocarbon composition control.

39 Claims, 12 Drawing Figures

BLOCK DIAGRAM OF SOUR GAS PROCESSING PLANT - BACKGROUND

CO₂ REMOVAL FROM HIGH CO₂ CONTENT HYDROCARBON CONTAINING STREAMS

FIELD OF THE INVENTION

The invention relates to a process for treating gaseous streams. In one aspect the invention relates to methods for removing carbon dioxide ($CO_2$) from gaseous streams. In another aspect, the invention relates to methods for removing $CO_2$ and/or hydrogen sulfide ($H_2S$) and/or hydrocarbons from gaseous streams.

BACKGROUND ON THE INVENTION

The development of low quality and sour gas reservoirs in recent years has required the development of new techniques for low quality gas handling. In addition, production of oil and gas by $CO_2$ miscible flooding for enhanced oil recovery can result in sour and low quality gas streams to be processed. A sour natural gas is a natural gas which contains, in addition to hydrocarbon components, one or more acid gas components. An acid gas component, for example, hydrogen sulfide ($H_2S$) or carbon dioxide ($CO_2$), forms an acidic aqueous solution. Gas sweetening involves almost complete removal of $H_2S$ and most of the $CO_2$ from sour natural gases. The sweetening is almost always required before the gas can meet sales gas specifications and before the sweet gas can be processed for production of ethane, propane, butane, and higher hydrocarbon liquid products.

The sour gases encountered today may contain in addition to $H_2S$ and $CO_2$, carbonyl sulfide, carbon disulfide, methyl through butyl mercaptans, and other volatile sulfur compounds. Almost complete removal of $H_2S$ and other volatile sulfur compounds is required to meet rigid sales gas specifications. $CO_2$ removal may be required, for example, to increase the heating value of the residue sales gas, prevent $CO_2$ frost formation during cryogenic processing, and the like.

FIG. 1, labeled "Block Diagram of Sour Gas Processing Plant—Background," illustrates the background of the invention in greater detail. A wellstream 11 from a sour gas reservoir is flash separated 12 into a gaseous stream 13 and a liquid stream 14. The liquid stream 14 is stabilized 16 to lower the vapor pressure of the liquid stream, thereby producing a stabilized condensate stream 17 and a vapor fraction stream 15 which is typically combined with gaseous stream 13 for gas treatment 18. Gas treatment 18 for a stream from a typical sour gas reservoir separates an acid gas stream 19 containing predominantly $H_2S$ and $CO_2$ which can be further processed in a sulfur plant 20 to produce an elemental sulfur product stream 21. Gas treatment 18 also typically produces a sweet gas stream 22 which after dehydration and recovery 23 produces a sweet residue gas stream 24, a liquefied petroleum gas (LPG) stream 25, and a natural gasoline liquids (NGL) stream 26. Dotted line 27 indicates generally the functional locus of the invention herein described in detail below.

In addition to the routine production of low quality and sour natural gas reservoirs, in recent years reduced petroleum reserves have resulted in development of enhanced oil recovery techniques, such as $CO_2$ miscible flooding, which can result in production of gas streams having a high acid gas content. In the application of $CO_2$ miscible flooding for enhanced oil recovery, the $CO_2$ content of the produced gas increases greatly, after breakthrough, even to levels as high as 98 mol% or higher. The modification of sour gas treating facilities to process such high, and, in the case of $CO_2$ miscible flooding, variable $CO_2$ loading represents a formidable engineering task.

At low $CO_2$ levels, established technology is and remains attractive; however, at higher levels, new processes are required. Thus, for example, the MEA (monoethanolamine) and DEA (diethanolamine) processes applied to the gaseous stream are economically attractive at $CO_2$ levels up to, for example, 30 mol% to 40 mol%. At higher $CO_2$ levels, due in part to high energy requirements for regenerating the rich MEA or DEA, other processes become desirable. The invention hereinbelow described is useful for processing high acid gas content natural gas streams and also is adapted for use where the composition of the gas stream, for example, a gas stream derived from a production stream from a reservoir undergoing $CO_2$ miscible flooding, is highly variable as hereinbelow described in greater detail.

SUMMARY OF THE INVENTION

According to the invention there is provided a process for treating a gaseous stream comprising hydrocarbons and $CO_2$, the process comprising (a) separating a portion of hydrocarbons from the gaseous stream to produce a first stream; (b) separating $CO_2$ from the first stream in a first $CO_2$ removal zone by absorption in a first solution effective for $CO_2$ removal to produce a hydrocarbon enriched second stream; (c) further separating $CO_2$ from the second stream in at least a second $CO_2$ removal zone by absorption in a second solution effective for $CO_2$ removal to produce a further hydrocarbon enriched third stream; and wherein the gaseous stream comprises $CO_2$ and hydrocarbons such that in the absence of step (a) hydrocarbon condensation occurs in at least one of steps (b) and (c).

According to a further aspect of the invention there is provided a process for treating a gaseous stream comprising (a) separating at least a first portion of hydrocarbons from the gaseous stream to produce a first stream having a reduced hydrocarbon content; (b) separating $CO_2$ from the first stream in a first $CO_2$ removal zone by absorption in a first solution effective for $CO_2$ removal to produce a hydrocarbon enriched second stream; (c) subsequently separating a second portion of hydrocarbons from the second stream to produce a third stream having a further reduced hydrocarbon content; and (d) further separating $CO_2$ from the third stream in at least a second $CO_2$ removal zone by absorption in a second solution effective for $CO_2$ removal to produce a further hydrocarbon enriched fourth stream; and wherein the separation of step (a) is effective for preventing hydrocarbon condensation during $CO_2$ removal in at least the first $CO_2$ removal zone, and the separation of step (c) is effective for preventing hydrocarbon condensation during $CO_2$ removal in said at least a second $CO_2$ removal zone.

According to another aspect of the invention there is provided a process for treating a gaseous stream comprising hydrocarbons and $CO_2$, the process comprising (a) separating a first portion of $CO_2$ from the gaseous stream in a permeation zone by selective permeation of $CO_2$ across a differentially permeable membrane to produce a $CO_2$ permeate stream and a hydrocarbon enriched first stream; and (b) further separating $CO_2$ from the hydrocarbon enriched first stream in at least one $CO_2$ absorption zone by absorption in a solution effective for $CO_2$ removal to produce a further hydrocarbon enriched process stream.

According to another aspect of the invention there is provided a process for treating a gaseous stream comprising hydrocarbons and $CO_2$, the process comprising (a) separating a first portion of $CO_2$ from the gaseous stream in a permeation zone by selective permeation of $CO_2$ across a differentially permeable membrane to produce a $CO_2$ permeate stream and a hydrocarbon enriched first stream; and (b) further separating $CO_2$ from the hydrocarbon enriched first stream in at least one $CO_2$ removal zone by cryogenically fractionating the hydrocarbon enriched first stream to produce at least a $C_1$ stream and a $CO_2$ stream.

Further aspects of the invention will be described below in the detailed description of the invention and the drawings, in which.

DESCRIPTION OF THE INVENTION

Figure 1:
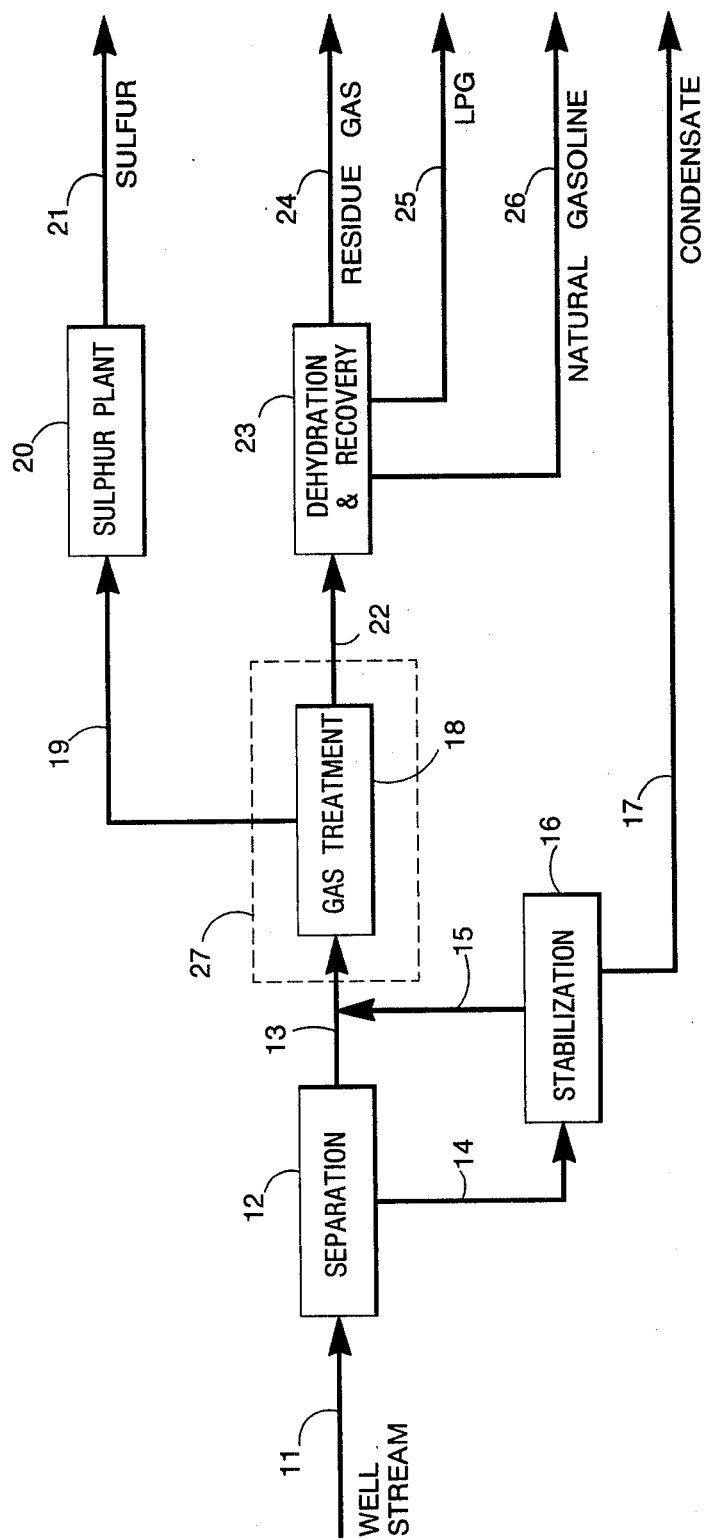
FIG. 1 represents a block diagram of a sour gas processing plant showing the background of the invention and indicating by dotted line 27 the functional site of the invention.

A. $CO_2$ Solution Absorption Processes With Hydrocarbon Control

1. Introduction

According to the invention is a process for $CO_2$ removal from a gaseous stream by $CO_2$ solution absorption in two or more stages with hydrocarbon control before one or more of the stages to prevent operating problems due to hydrocarbon condensation as $CO_2$ is removed.

2. The Gaseous Stream

The gaseous stream to be treated in accordance with this aspect of the invention comprises hydrocarbons and $CO_2$. The hydrocarbons include $C_3$ and heavier hydrocarbons and the gaseous stream is such that, in the absence of control of the hydrocarbon composition of the gaseous stream, hydrocarbon condensation, especially condensation of $C_3$ and heavier hydrocarbons, can occur during $CO_2$ removal by solution absorption. The gaseous stream can also contain $H_2S$ and other components.

The gaseous stream can be processed according to the invention to produce (1) a sweet hydrocarbon stream containing, for example, less than 2 mol% $CO_2$ and 4 ppm $H_2S$ which can be further processed, for example, for NGL recovery, (2) a $CO_2$ stream of high purity containing, for example, less than about 100 ppm $H_2S$, and (3) in some instances where $H_2S$ is present, an $H_2S$-containing acid gas stream which can be further processed, for example, in a sulfur recovery facility.

The gaseous stream, as indicated, contains $CO_2$ and hydrocarbons, especially $C_3$ and heavier hydrocarbons, such that in the absence of hydrocarbon composition control, hydrocarbon condensation can occur during $CO_2$ removal. The gaseous stream can contain, for example, from about 20 mol% $CO_2$ to about 99 mol% $CO_2$, since above about 20 mol% $CO_2$ the $CO_2$ solution absorption process according to the invention becomes increasingly significant and economic. Further, our studies have indicated that conventional solution processes for $CO_2$ removal, such as alkanolamine solution processes and hot potassium carbonate solution processes, continue to be energy intensive above about 30 mol% $CO_2$ while the energy requirements for the process according to the invention drop off above that level. Preferably, then, the gaseous stream comprises in the range from about 30 mol% $CO_2$ to about 95 mol% $CO_2$ since above about 30 mol% $CO_2$ the inventive process looks most competitive compared with conventional processes and above about 95 mol% $CO_2$, $CO_2$ removal does not appear economically justified. Most preferably the gaseous stream comprises in the range from about 30 mol% to about 60 mol% $CO_2$ since above about 60 mol% other processes hereinafter described are preferred.

According to a preferred embodiment, the gaseous stream can be from, for example, a wellhead gas separator where the well is producing from a reservoir undergoing enhanced oil recovery using carbon dioxide-miscible flooding. Such a wellhead gas separator stream during the course of production from the reservoir can show widely varying composition. In such a stream, for example, the $CO_2$ content of the wellhead gas can vary from essentially zero percent even to as high as 98 mol% or higher with a rate of $CO_2$ buildup differing for each field, depending on reservoir geometry and heterogeneity, injection schedules, and other factors. In addition, it appears that other components of the produced gas stream will also vary. Thus, for example, flash calculations indicate that the proportion of $C_4$ and heavier hydrocarbons varies with varying amounts of $CO_2$. The proportion of $C_4$ and heavier hydrocarbons shows a marked increase as the $CO_2$ level increases, for example, during the course of a flood. Such calculations also indicate, for example, that the hydrogen sulfide ($H_2S$) content in the $CO_2$ fraction decreases as the $CO_2$ content of the wellhead gas separator stream increases. These aspects of the gaseous streams will be further discussed below in the detailed description of the drawings.

3. Hydrocarbon Composition Control

One consequence of the variation in gas composition is that the gas treating facilities for handling such gaseous streams must be capable of handling a wide variation in $CO_2$ content of the produced gas. Further, the variation in heavier hydrocarbon content must also be taken into account in the design and operation of such facilities.

As described in more detail below, in the $CO_2$ absorption process according to the invention, $CO_2$ is removed from the gaseous streams in two or more stages or zones utilizing preferably aqueous alkanolamine solutions. The gaseous stream comprising hydrocarbons, $CO_2$, and sometimes $H_2S$, is also treated prior to at least one of, and preferably prior to more than one of or even prior to each of, the $CO_2$ absorption stages to prevent the presence of heavy ($C_3$ and higher) hydrocarbons from causing operating inefficiencies by hydrocarbon condensation in the absorbers during $CO_2$ removal.

According to a preferred embodiment, at least a portion of heavy hydrocarbons are removed by chilling prior to a $CO_2$ absorption stage or zone to a temperature such that, at the operating temperature and pressure of the $CO_2$ absorber, hydrocarbon condensation does not occur during $CO_2$ removal in at least that zone. It is of course possible and in the spirit of the invention to chill the gaseous stream prior to the first or any other $CO_2$ absorber such that hydrocarbon condensation does not occur in that absorber or in any subsequent absorber. Preferably, however, since the $CO_2$ removal can occur in two or more stages or zones, the chilling can be accomplished prior to each $CO_2$ removal stage or zone to a degree effective for preventing hydrocarbon condensation during the immediately subsequent $CO_2$ removal zone or stage. Such a $CO_2$ absorption process with interstage chilling can result, for example, in substantial reductions in refrigeration costs since removal of $CO_2$ very significantly reduces the volume of gas to be subsequently chilled. Further, by staging the $CO_2$ removal as described herein, hydrocarbon control by chilling can be accomplished at higher temperatures for a designated stage of $CO_2$ removal than would be required if a single stage of $CO_2$ removal were utilized, thus further reducing refrigeration costs.

To avoid operating problems which can be caused by hydrocarbon condensation in the absorbers, such as, for example, foaming in a triethanolamine (TEA) absorber, the process stream is preferably chilled at the absorber operating pressure or somewhat higher pressure to a temperature such that the hydrocarbon dewpoint of the gas during $CO_2$ removal always is below the operating temperature within the absorber. As used herein, the hydrocarbon dewpoint temperature is that temperature at which hydrocarbon condensation first occurs when a gas at a given pressure is cooled. As the $CO_2$ is removed from the ascending gas in the absorber, the hydrocarbon dewpoint increases forming a hydrocarbon dewpoint temperature curve or profile as a function of $CO_2$ removal. It is highly desirable to operate with absorber temperatures well above (greater than) the hydrocarbon dewpoint temperature profile, and therefore it is desired to chill the process stream to a temperature at least 10° F. less than the hydrocarbon dewpoint temperature of the absorber offgas for the absorber for which hydrocarbon control is desired. Most preferably, the temperature margin between the absorber temperature and the hydrocarbon dew point temperature profile is greater than 10° F., for example, 15° F. or more. To accomplish this, the feed gas to a $CO_2$ removal stage is preferably chilled to a temperature such that the hydrocarbon dewpoint temperature of the absorber offgas is, for example, at least 10° F. greater than the absorber top tray operating temperature. It will be appreciated by those skilled in the art that larger temperature margins provide assurance that hydrocarbon condensation will not occur but can result in greater refrigeration costs. Most preferably, therefore, the temperature margin is in the range of about 15° F. to about 30° F.

As indicated, hydrocarbon control is accomplished according to a preferred embodiment by staged chilling to condense hydrocarbons which would otherwise condense out during $CO_2$ removal in the absorber. Other methods, however, for hydrocarbon control in accordance with the invention can also be utilized.

4. $CO_2$ Absorption

As indicated, according to the invention, a gaseous stream comprising hydrocarbons and $CO_2$ is contacted in two or more absorber stages or zones with solution(s) effective for $CO_2$ removal from the process stream.

Preferably, the gaseous stream from which at least a first portion of heavy $C_3$ and higher hydrocarbons have been separated is contacted in a first absorber zone with an aqueous tertiary alkanolamine, for example, triethanolamine (TEA), methyldiethanolamine (MDEA), and the like. Such tertiary amines have a relatively lower reactivity than primary or secondary alkanolamines toward acid gas components but are characterized by relatively low energy requirements for regeneration of the rich amine solution; however, as a result of having such lower reactivity, such alkanolamines are relatively inefficient for nearly quantitative removal of acid gas components. In accordance with the invention, moreover, the absorbers, including the tertiary alkanolamine absorbers, are preferably operated such that both $H_2S$ and bulk $CO_2$ removal occurs. Since the $H_2S$ is more rapidly removed than the $CO_2$, much of the $H_2S$ in the chilled gaseous stream can be removed by the tertiary alkanolamine absorber.

Preferably, the tertiary alkanolamine absorber (first absorber zone) is operated such that the process stream has a $CO_2$ level reduced to a point effective for economical operation of at least one subsequent (second) absorber zone utilizing a primary or secondary alkanolamine, such as, for example, monoethanolamine (MEA), diethanolamine (DEA), and the like. Such primary or secondary alkanolamines are characterized by higher energy requirements for amine regeneration but are efficient for nearly complete removal of acid gas components from the hydrocarbon enriched process stream. By arranging the removal of the acid gas components so that in a first stage $H_2S$ and bulk $CO_2$ removal occurs using an aqueous alkanolamine having low reactivity and low regeneration energy requirements followed by a second stage of $H_2S$ and $CO_2$ removal characterized by use of an aqueous alkanolamine having relatively high reactivity and high regeneration energy requirements, a process is provided which accomplishes nearly complete removal of $H_2S$ and $CO_2$ while still being relatively energy efficient in comparison to using only a primary or secondary alkanolamine.

The purified hydrocarbon stream from the second stage absorber zone described above can be further processed, for example, in a natural gas liquids (NGL) recovery plant. The acid gas streams removed in the absorber zone(s) can be further processed in a third selective absorber zone to separate $H_2S$ from the $CO_2$ to produce a purified $CO_2$ stream suitable for pipelining and/or reinjection into the reservoir undergoing enhanced oil recovery. According to a preferred embodiment, the selective absorber zone comprises one or more absorbers using a solution effective for separating $H_2S$ from $CO_2$, for example, the SELEXOL process developed by Allied Chemical Corporation. Solubility of $H_2S$ in the SELEXOL solution (the dimethyl ether of polyethylene glycol) is about nine times the solubility of carbon dioxide, which makes the process useful for selective and nearly quantitative removal of hydrogen sulfide and other sulfur compounds such as, for example, methyl mercaptan and carbonyl sulfide, from the $CO_2$ which is present. Although the SELEXOL process and solution are currently preferred, any chemical absorbent or other process capable of selectivity towards $H_2S$ or $CO_2$ can be used in accordance with the invention.

B. Combination Staged Processes for $CO_2$ Removal

1. Introduction

According to the invention, there are provided combination staged processes for $CO_2$ removal from gaseous streams containing hydrocarbons. According to this aspect of the invention, a first portion of $CO_2$ is removed in a permeation zone containing membranes selectively permeable to $CO_2$ to produce a hydrocarbon enriched process stream of reduced $CO_2$ content. $CO_2$ is further removed from the hydrocarbon enriched process stream by cryogenic fractionation and/or by $CO_2$ solution absorption.

At the outset of our investigation into removal of $CO_2$ from hydrocarbon gaseous streams containing high levels of $CO_2$, it was not apparent that combination staged processes for $CO_2$ removal would provide such significant cost and/or energy benefits. As is and was generally known, conventional $CO_2$ removal processes become less costly per unit quantity $CO_2$ removed as the mol% $CO_2$ content of the gaseous stream becomes greater. What was not immediately apparent, however, was that a hierarchy and staging of $CO_2$ removal processes as described herein would provide optimal solutions to the problem of bulk $CO_2$ removal from hydrocarbon containing gaseous streams. The $CO_2$ removal processes are not combined randomly; rather each process is utilized for $CO_2$ removal in a sequence such that the combined staged processes according to the invention provide highly efficient processes for bulk $CO_2$ removal.

2. The Gaseous Stream

The gaseous stream to be treated in accordance with this aspect of the invention comprises hydrocarbons, at least $C_1$ and/or $C_2$ hydrocarbons, and carbon dioxide. Any amount of $CO_2$ can be removed in accordance with the invention; preferably, however the gaseous stream will contain above about 30 mol% $CO_2$ since the process according to the invention becomes economically and especially energy competitive above about that level. More preferably the gaseous stream will contain in the range from about 30 mol% $CO_2$ to about 95 mol% $CO_2$ since above about 95 mol% $CO_2$ separation of $CO_2$ and hydrocarbons will not generally be economically justified. Most preferably the gaseous stream will contain in the range from above about 60 mol% $CO_2$ to about 95 mol% $CO_2$ since cryogenic distillative fractionation plants and the $CO_2$ absorption solution processes described hereinabove can be very efficiently designed to handle up to about 60 mol% $CO_2$.

Where the gaseous stream does not comprise heavier ($C_3$ and higher) hydrocarbons which can condense out during $CO_2$ removal, hydrocarbon control will not generally be necessary. According to a further aspect of the invention, however, the gaseous stream can contain such $C_3$ and higher hydrocarbons and in a preferred embodiment the gaseous stream can be from a wellhead gas separator where the well is producing from a reservoir undergoing enhanced oil recovery utilizing $CO_2$ miscible flooding as described above. In such cases, hydrocarbon control will be necessary as herein described.

3. Hydrocarbon Composition Control

As indicated, the invention is directed to processes for removal of $CO_2$, and in some instances, $H_2S$, from gaseous streams containing high levels of $CO_2$. According to this aspect of the invention, a gaseous stream containing hydrocarbons and $CO_2$ preferably from above about 30 mol% $CO_2$ is initially contacted in a permeation zone containing one or more permeators comprising differentially permeable membranes selectively permeable to $CO_2$ relative to hydrocarbons to selectively remove $CO_2$ therefrom to a level suitable for a subsequent $CO_2$ removal process.

Where the gaseous stream does not contain $C_3$ and heavier hydrocarbons in an amount which will condense out during $CO_2$ removal, control of the hydrocarbon composition will not generally be necessary. Where $C_3$ and heavier hydrocarbons are present in an amount to condense out during $CO_2$ removal hydrocarbon control will be necessary.

Hydrocarbon control can be by any method but preferably will be accomplished by chilling as discussed above with respect to $CO_2$ absorption processes. In the case of permeators also, multistage hydrocarbon control is preferred, although single stage control can also be utilized. In either instance, the process stream is preferably chilled such that the temperature margin between the dewpoint temperature profile of the process stream within a permeator and the operating temperature of a respective permeator is in the ranges set forth above with respect to $CO_2$ absorption processes.

4. Permeation for $CO_2$ Topping

As indicated above, in processing a gaseous stream containing hydrocarbons and a high level of $CO_2$ by a $CO_2$ removal process including amine absorbers, the gaseous stream must be compressed and treated to remove hydrocarbons, if necessary, such that as large amounts of $CO_2$ are removed, hydrocarbons do not condense out in, for example, the permeation zone. The gaseous stream from which hydrocarbons have been removed, preferably by chilling, to a level effective to prevent hydrocarbon condensation during subsequent $CO_2$ removal is treated by contacting the chilled gaseous stream in the permeation zone with one or more permeators containing membranes selectively permeable to $CO_2$ to selectively remove $CO_2$ therefrom to produce a $CO_2$ stream of high purity and a hydrocarbon enriched stream of reduced $CO_2$ content. The permeators can comprise any membranes selectively permeable to $CO_2$ such as, for example, specially prepared cellulose triacetate membranes manufactured by Dow Chemicals, Inc. or polysulfone membranes manufactured by Monsanto Chemical Co. The permeation process is based on the fact that with a pressure gradient established across such membranes carbon dioxide permeates through the membrane more rapidly than gaseous hydrocarbon constituents such as methane. The flow rate for each component across the membrane is characterized by a permeability rate coefficient defined as the lb mols/hr of flow per square foort of membrane per psi average partial pressure differential of the component across the membrane. The ratio of the permeability coefficient for $CO_2$ to that for a hydrocarbon, for example, methane, represents the selectivity ratio for $CO_2$ relative to that hydrocarbon. Suitable membranes for use in accordance with the invention preferably have selectivity ratios greater than about 10 and more preferably greater than about 15, although membranes with selectivity ratios lower than 10 can also be used. It will be apparent to those skilled in the art that yet higher selectivity ratios are desirable if such selectivity can be accomplished at an adequate permeability rate.

The higher the $CO_2$ content of the gaseous stream being processed, the more effective permeation becomes because high $CO_2$ partial pressure results in high $CO_2$ permeation rate and high purity of the $CO_2$ permeate. Conversely, attempting to produce a hydrocarbon enriched process gas stream with low $CO_2$ content tends to lower both $CO_2$ permeation rate and permeate purity. By use of multistage permeator units with appropriate interstage recompression and hydrocarbon control, for example, by chilling, it is possible at some cost to achieve any desired degree of separation.

In accordance with the invention, however, permeators comprising membranes selectively permeable to $CO_2$ are utilized to top off $CO_2$ from the gaseous stream being processed. For the instance where, after the permeation zone, the gaseous stream is subjected to cryogenic fractionation discussed in greater detail below the $CO_2$ level is preferably reduced to an efficient operating range for cryogenic fractionators, for example, to a $CO_2$ level of about 30 mol% to about 60 mol% $CO_2$. Other levels of $CO_2$ removal by the permeators can, of course, also be utilized in accordance with the invention.

Alternatively, after the permeation zone the gaseous process stream can be treated by contacting the stream with an aqueous alkanolamine stream under conditions effective for bulk removal of carbon dioxide from the stream.

5. Permeation/Solution Absorption

According to this aspect of the invention, a gaseous stream comprising hydrocarbons and broadly above about 30 mol% $CO_2$ can utilize, as a suitable subsequent $CO_2$ removal process after the permeation zone, chemical solution absorption, for example, by aqueous alkanolamines as described in greater detail below. Conventional alkanolamine processes can be efficiently used up to about 30 mol% $CO_2$ in the case of primary or secondary alkanolamines, for example, MEA and/or DEA. A combined absorption process as described herein can be used efficiently up to about 60 mol% $CO_2$ or even higher. By installing a membrane permeator unit ahead of, for example, an alkanolamine solution absorber, to top out $CO_2$, and thereby reduce the $CO_2$ load on the absorber system, a significant reduction in cost and/or energy requirements for $CO_2$ removal can be effected for feeds with higher $CO_2$ content. In this situation, as described in greater detail below, the feed treatment necessary to prevent liquid hydrocarbon dropout in the permeation zone can also be effective for conditioning the process stream to prevent hydrocarbon condensation or dropout in the absorption zone.

6. Permeation/Cryogenic Fractionation

Where the gaseous stream contains above about 30 mol% $CO_2$ an alternative suitable subsequent $CO_2$ removal process is a cryogenic distillative fractionation process as hereinafter described in greater detail. In this instance the cryogenic fractionation process is preferably designed to handle gaseous feeds containing, for example, from about 30 mol% to 60 mol% $CO_2$, although the invention can also be practiced with cryogenic fractionation plants for other $CO_2$ ranges. When the $CO_2$ content of the gaseous stream exceeds the design level for the cryogenic fractionation process, a permeation zone comprising one or more permeators utilizing membranes selectively permeable to $CO_2$ relative to hydrocarbons is utilized to produce a relatively high purity $CO_2$ permeate (for example, about 95 mol% minimum $CO_2$ content where the $CO_2$ stream is to be utilized for miscible flooding for enhanced oil recovery) and to produce a hydrocarbon rich process stream with a reduced $CO_2$ content which can be processed in the cryogenic fractionation system.

The combination of permeation and cryogenic fractionation as herein described has certain advantages. The energy consumption and capital investment costs for the cryogenic fractionation system, especially refrigeration costs, increase with $CO_2$ content. On the other hand, the permeation process becomes more energy and investment efficient at higher $CO_2$ levels due in part to the high $CO_2$ permeation rate and high purity of the $CO_2$ permeate at high partial pressures of $CO_2$. The permeation process can thus serve as an effective $CO_2$ topping method for the cryogenic fractionation process and can thereby extend the range of $CO_2$ content in the gaseous feeds which can be economically processed. The combination of the permeation and cryogenic processes also is advantageous in that the drying and feed preparation process appropriate for protection of the permeation membrane(s) can also be used for operation of the cryogenic fractionation process so that the combination of permeation and cryogenic fractionation integrates in fact very nicely.

Thus, in cryogenic fractionation the feed must be further chilled and compressed, for example, to a temperature preferably in the range of about $-15°$ F. to about $-30°$ F. prior to entering, for example, a cryodemethanizer column in which $C_1$ hydrocarbon (methane) is separated from $CO_2$ and other gaseous and other components of the process stream. Such chilling of course results in liquefaction of most of the $CO_2$, ethane, and heavier hydrocarbons in the feed. Consequently, the chilling of the gaseous stream to the permeation zone to prevent hydrocarbon condensation in the permeation zone can be integrated efficiently with the chilling required for the cryogenic fractionation process.

Generally, in design and operation of the combined or integrated permeation/cryogenic fractionation process, the operating pressure for the permeator and the degree of $CO_2$ removal ("topping") in the permeator(s) is preferably selected to minimize energy requirements and/or overall $CO_2$ removal costs.

DETAILED DESCRIPTION OF THE DRAWINGS AND EXAMPLES

Referring now to the drawings and in particular to FIG. 1, dotted line 27 indicates generally the functional site of the process according to the invention in a sour gas processing plant. Other uses of the invention can of course be made and it is not intended by the illustration of FIG. 1 to limit the invention thereto but to illustrate a preferred application of the invention. Other portions of FIG. 1 have been described above relating to the Background of the Invention and will not be repeated here.

Figure 2:
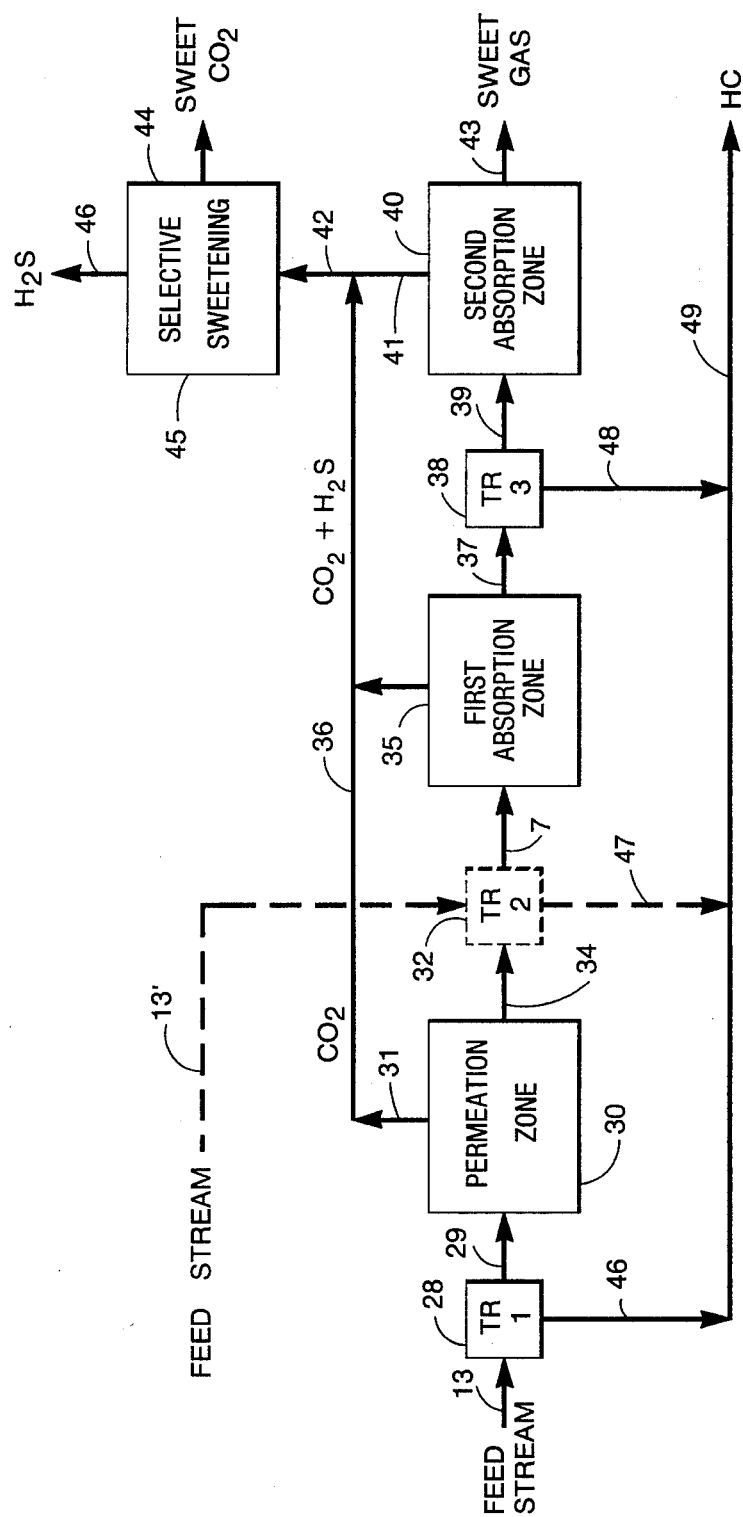
FIG. 2 represents a block diagram of one embodiment of the invention.

Referring now to FIG. 2, FIG. 2 represents schematically a block diagram of the process according to the invention using chemical solution absorption for $CO_2$ removal either separately or as part of a combination process after a permeation zone. Line 13 represents a gaseous stream containing carbon dioxide and hydrocarbons as described above, from, for example, a wellhead gas separator. After compression to the operating pressure of the permeation zone 30, stream 13 is provided to first treater 28 (TR1) in which the stream 13 is, for example, chilled. In an alternative embodiment, stream 13' can be provided directly to the $CO_2$ first absorption zone 35 as shown after treating, for example, by chilling in an optional second treater (TR2) 32 to remove hydrocarbons via stream 47 which could otherwise condense out during $CO_2$ removal. Stream 13 is chilled in first treater 28 to a level effective for preventing hydrocarbon condensation during subsequent removal of carbon dioxide in permeation zone 30 and preferably at least in first absorption zone 35. Thus, for example, if subsequent removal of $CO_2$ is to be from a first level in stream 13 to a second level after first absorption zone 35, treater 28 chills the stream 13 to a temperature effective to remove hydrocarbons from the process stream which can otherwise condense, for example, in the permeation zone 30 and/or in the first absorption zone 35 as carbon dioxide is removed to the second level. It is, of course, also possible and in accordance with the invention to chill stream 13 in first treater 28 to a temperature effective for preventing hydrocarbon condensation in the permeation zone 30 and thereafter operating first absorption zone 35 at a temperature which would require additional treating, for example, by chilling and separation of hydrocarbons in optional second treater 32 with hydrocarbons removed via stream 47 indicated by dotted lines following permeation zone 30.

The chilled and compressed stream 29 from which a first portion of predominantly heavier ($C_3$ and higher) hydrocarbons have been removed is introduced into a permeation zone 30 in which at least a portion of the $CO_2$ in the chilled compressed stream 29 is removed by selective permeation to produce high purity $CO_2$ stream 31 and a hydrocarbon enriched process stream 34 of reduced $CO_2$ content. Process stream 34, or in a alternative embodiment, chilled stream 7 from second treater 32, is preferably provided to the first absorption zone 35. Alternatively, if necessary, stream 34 can be provided to a second treater to remove at least a second portion of hydrocarbons, especially $C_3$ and heavier hydrocarbons, which could otherwise condense in first absorber zone 35 and then introduced into first absorber zone 35. First absorber zone 35 preferably utilizes an aqueous tertiary alkanolamine solution having a relatively low reactivity for carbon dioxide and hydrogen sulfide and relatively low energy requirements for regeneration. Suitable aqueous alkanolamines include, for example, triethanolamine (TEA) and methyldiethanolamine (MDEA). Preferably, TEA is used, for example, in an aqueous solution, comprising preferably about 35 to about 40 wt% TEA and preferably the TEA absorber is operated in the range of about 160° F. to about 180° F. to minimize viscosity effects and because operation at this temperature range also integrates efficiently with permeation to reduce refrigeration duty as described in more detail below, for example, by eliminating or reducing interstage treating. Carbon dioxide and hydrogen sulfide are removed from stream 34 in first absorber zone 35 to produce a hydrocarbon enriched process stream 37 of reduced $CO_2$ content and an acid gas stream 36 containing $CO_2$ and $H_2S$. The level to which $CO_2$ and $H_2S$ are removed in first absorption zone 35 is a function, among other things, of total absorption energy requirements. Typically, it is preferred in the first absorber zone that the $CO_2$ be reduced from a first level to a second level, typically about 10 mol% $CO_2$ to about 20 mol% $CO_2$, where the second level is such that the second absorber zone by utilizing an aqueous alkanolamine solution characterized by relatively high reactivity toward $CO_2$ and $H_2S$ and relatively higher energy requirements for regeneration of the alkanolamine can be operated for substantially complete removal of acid gas components.

Stream 37 can be provided to third treater 38 (TR3) to remove a third portion of hydrocarbons, especially $C_3$ and heavier hydrocarbons, in stream 37 which could otherwise condense in second absorber zone 40. The treated stream 39 from third treater 38 is provided to second absorber zone 40 utilizing, for example, an aqueous secondary alkanolamine, such as diethanolamine (DEA) or a primary alkanolamine such as monoethanolamine (MEA). Preferably, DEA is used in an aqueous alkanolamine solution comprising, for example, about 30 to about 40 wt% DEA. The second absorber zone 40 further removes $CO_2$ and $H_2S$ from process stream 39 to produce a sweet gas stream 43 having less than, for example, about 2 mol% $CO_2$, and less than about 4 ppm mol% $H_2S$, if $H_2S$ is present, and an acid gas stream 41.

In the illustrated embodiment acid gas stream 31 from permeation zone 30, acid gas stream 36 from the first absorption (absorber) zone 35 and acid gas stream 41 from second absorption (absorber) zone 40 are combined in stream 42 and provided to a selective sweetening zone 45 in which $CO_2$ is separated from $H_2S$ to produce a sweet (i.e., less, for example, than about 100 ppm $H_2S$) $CO_2$ stream 44, which can be pipelined and/or reinjected for $CO_2$ and an $H_2S$ containing stream 46 which can be, for example, sent to a sulfur plant (see FIG. 1). Hydrocarbon streams 46, 47, and 48 can be combined as appropriate, for example, in stream 49 which can be further processed for NGL recovery.

Figure 3:
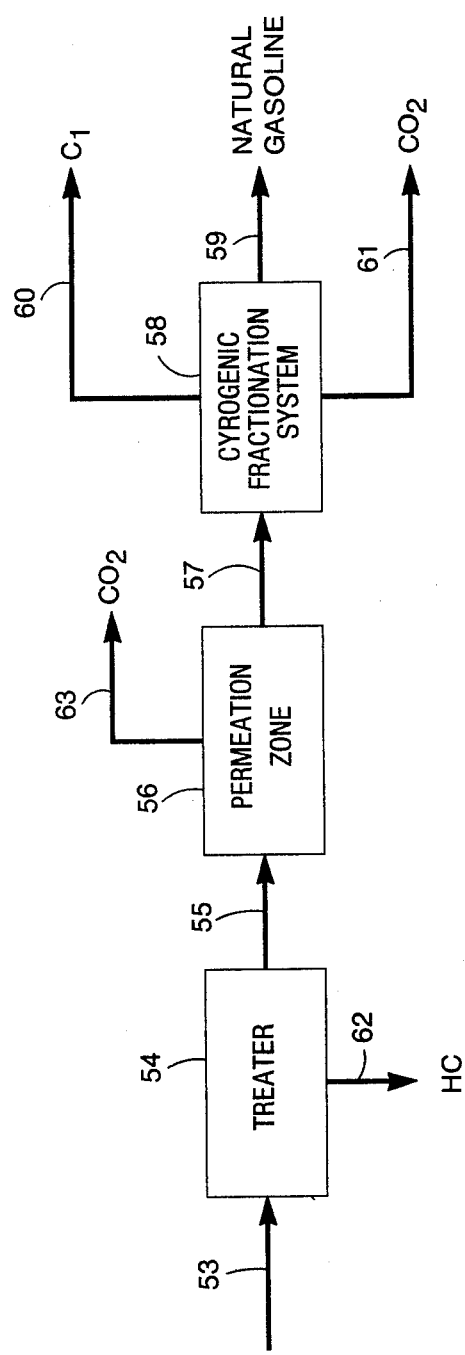
FIG. 3 represents a block diagram of a second embodiment of the invention.

Referring now to FIG. 3, FIG. 3 represents a block diagram of a process according to the invention using cryogenic fractionation for $CO_2$ removal after permeation. Line 53 represents a gaseous stream containing carbon dioxide and hydrocarbons as described above, from, for example, a wellhead gas separator. Stream 53 is provided to treater 54 in which compressed stream 53 is, for example, chilled to remove a first portion of hydrocarbons, especially $C_3$ and heavier hydrocarbons, in stream 62 to prevent hydrocarbon condensation in the permeation zone 56 as $CO_2$ is removed. Chilled compressed stream 55 from treater 54 is provided to permeation zone 56 comprising one or more permeators with interstage recompression and chilling, if necessary or appropriate, and containing membranes selectively permeable to $CO_2$ to remove a portion of the $CO_2$ therein as high purity sour $CO_2$ stream 63 and to produce a hydrocarbon enriched process stream 57 of reduced $CO_2$ content. Stream 57 is provided to cryogenic fractionation system 58 to produce sweet gas stream 60 containing $C_1$ (methane) and some lighter hydrocarbons and less, for example, than 2 mol% $CO_2$ and/or 4 ppm $H_2S$, stream 61 containing sweet $CO_2$ containing, for example, less than about 100 ppm $H_2S$, and a sour natural gas liquid stream 59.

Figure 4:
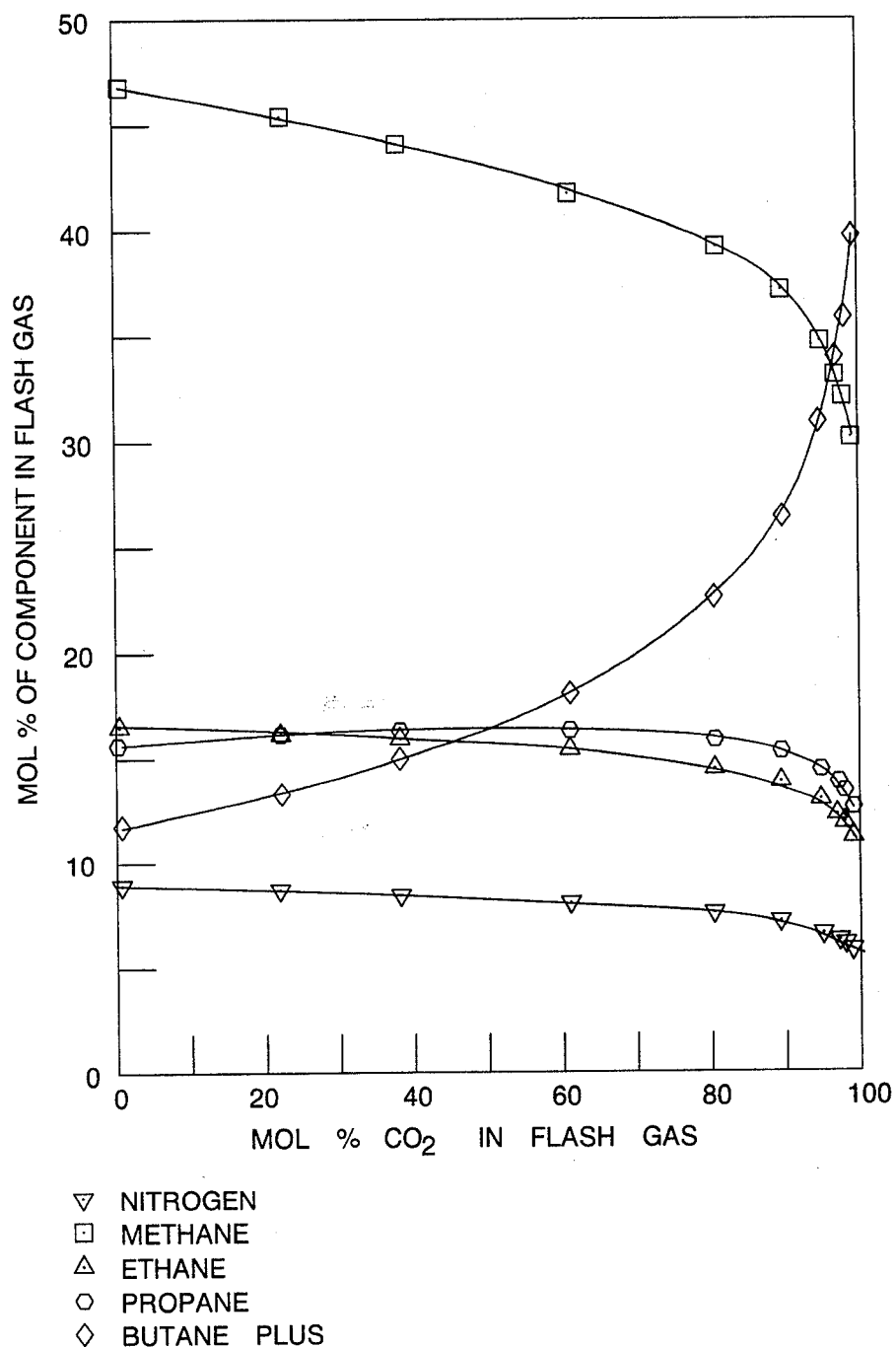
FIG. 4 represents graphically variations in hydrocarbon composition on an acid gas free basis of wellhead separator gas streams with $CO_2$ content.

Referring now to FIG. 4, FIG. 4 illustrates graphically the composition and variation in hydrocarbon content (reported on an acid gas free basis) expected in the flash gas from a field separator operating, for example, at 100° F. and 30 psia, for varying mol% $CO_2$ in the flash gas. The curves are based upon calculations based on flashing mixtures of a West Texas reservoir oil of known composition using a modified Redlich-Kwong Equation of State (see, for example, K. C. Chao and R. L. Robinson, Jr., Equations of State in Engineering and Research, Ch. 21, "Applications of a Generalized Equation of State to Petroleum Reservoir Fluids," Adv. Chem. Ser. 182, Am. Chem. Soc., Washington, D.C., (1979); and Turek, et al., Phase Equilibria in Carbon Dioxide-Multicomponent Hydrocarbon Systems: Experimental Data and an Improved Prediction Technique, print of paper presented at 55th Annual Fall Technical Conference and Exhibition of the Society of Petroleum Engineers, Dallas, Tex., September 1980.

FIG. 4 illustrates that, for example, as the $CO_2$ content of the well separator flash gas increases, for example, after $CO_2$ breakthrough during recovery from a $CO_2$ miscible flooding recovery project, the hydrocarbon fraction comprising $C_4$ and heavier hydrocarbons, designated "Butane Plus" in FIG. 4, increases rapidly with an increase in $CO_2$ content especially above about 60 mol% $CO_2$ in the flash gas. Conversely, the methane fraction falls off increasingly rapidly especially above about 60 mol% $CO_2$. Nitrogen, ethane, and propane functions also decline at higher $CO_2$ levels. Accordingly, the process according to the invention for removal of heavy hydrocarbons becomes increasingly important at higher $CO_2$ levels such as above about 60 mol% $CO_2$.

Figure 5:
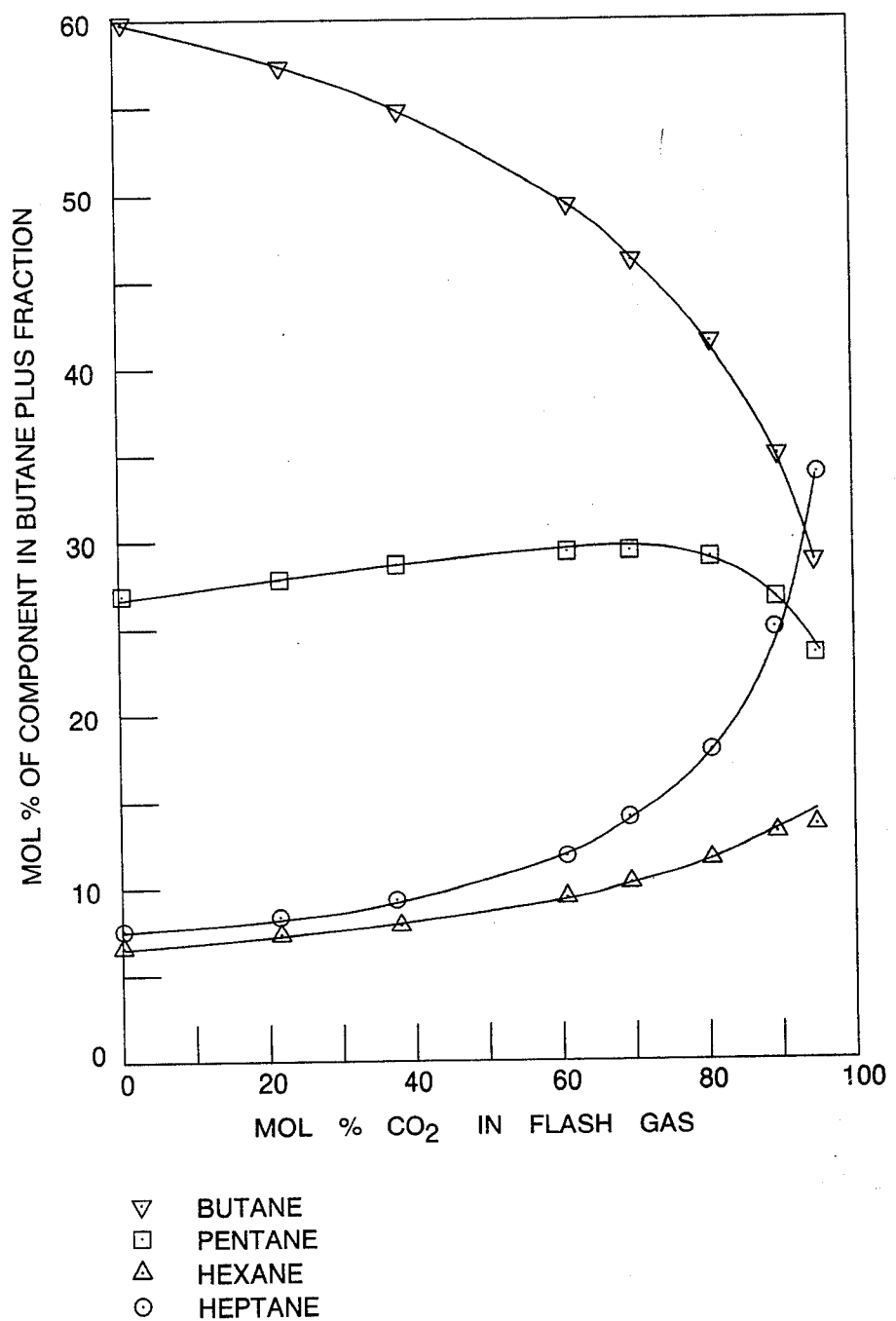
FIG. 5 represents graphically variations in composition of the Butane-Plus ($C_4$ and heavier hydrocarbons) fraction of a wellhead separator gas stream with $CO_2$ content.

FIG. 5 (based upon flash calculations using a modified Redlich Kwong Equation of State as set forth above in reference to FIG. 4) represents graphically variations in the composition of the Butane Plus fraction ($C_4$ and heavier hydrocarbons) from a wellhead separator gas stream as a function of $CO_2$ content. As indicated above for FIG. 4, the Butane Plus fraction increases rapidly at high $CO_2$ levels, for example, above about 60 mol% $CO_2$. FIG. 5 indicates that the increase in Butane-Plus fraction is largely a function of an increase in $C_6$ (Hexane) and heavier ("Heptane Plus") hydrocarbons. As indicated above, the content of $C_3$ and heavier hydrocarbons must be adjusted to prevent hydrocarbon condensate formation during removal of $CO_2$. FIG. 5 indicates that in the illustrated case, the adjustment involves removal of hydrocarbons which contain an increasing proportion of $C_6$ and heavier hydrocarbons.

Figure 6:
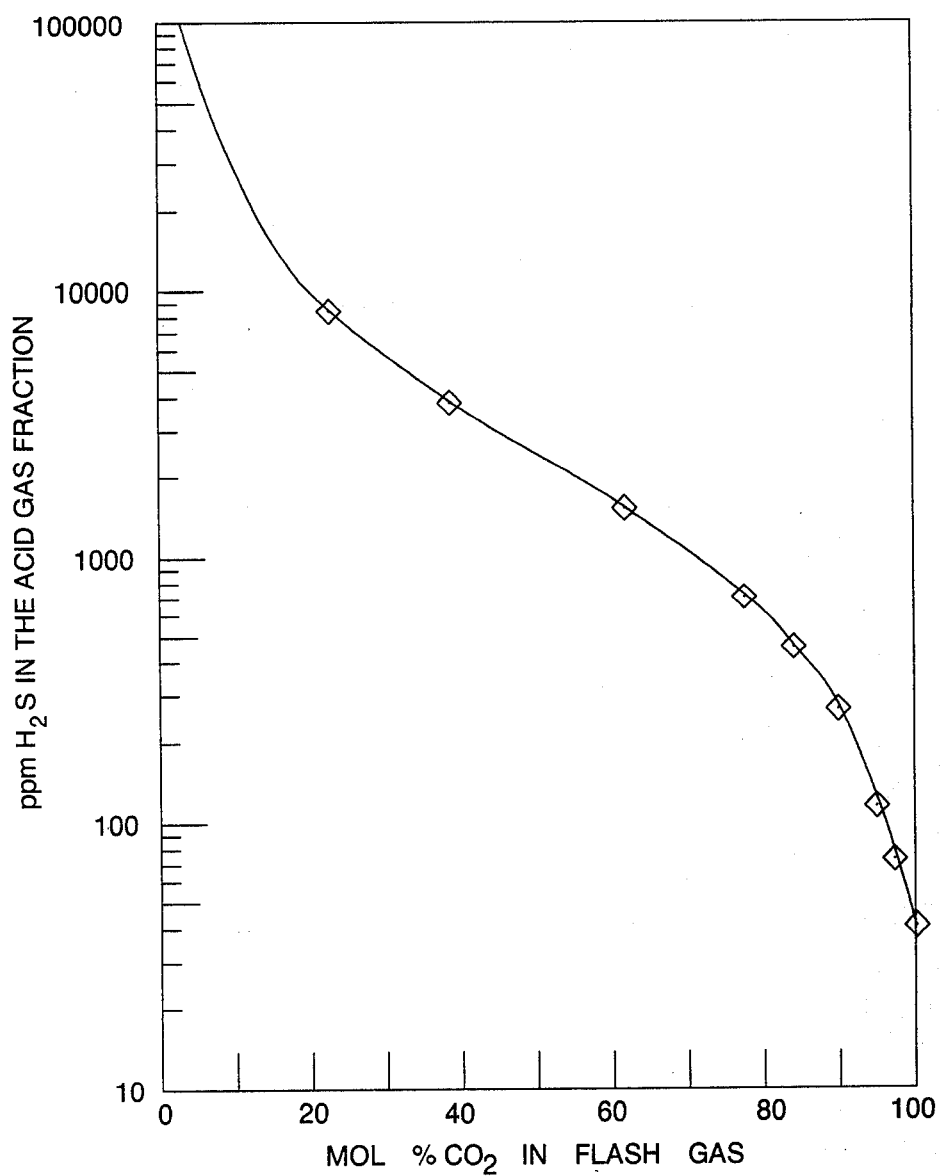
FIG. 6 represents graphically variations in $H_2S$ content in the acid gas fraction of wellhead separator gas streams with $CO_2$ content.

FIG. 6 (based on flash calculations using a modified Redlich-Kwong Equation of State as set forth above in reference to FIG. 4) represents graphically variations in $H_2S$ content the acid gas fraction in the wellhead separator gas stream as a function of $CO_2$ content. As indicated in FIG. 6, the $H_2S$ content of the acid gas fraction decreases as the $CO_2$ level increases, and in the case illustrated actually falls below the 100 ppm level when $CO_2$ content reaches about 95 mol%.

Figure 7:
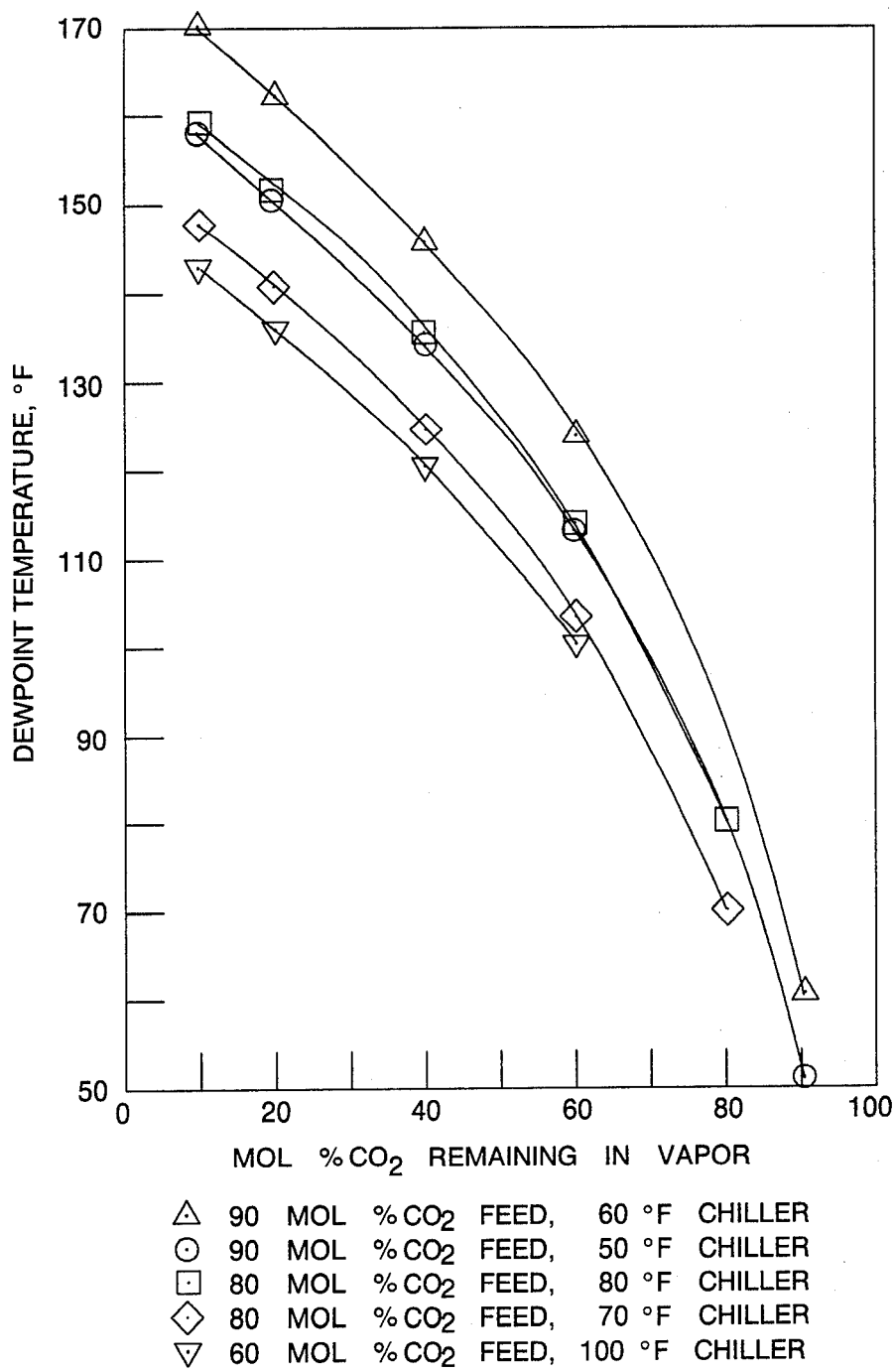
FIG. 7 represent graphically absorber dewpoint temperatures at 250 psia as a function of the $CO_2$ content of the gaseous stream being processed.

FIG. 7 (based on a modified Redlich-Kwong Equation of State as set forth above in reference to FIG. 4) represents graphically absorber hydrocarbon dewpoint temperatures at 250 psia as a function of $CO_2$ content remaining in the process stream in, for example, a TEA absorber operating without a permeation zone preceding the absorber. In accordance with the invention, it has been discovered that as $CO_2$ is removed, for example, from the vapor ascending in a first absorber zone using an aqueous TEA solution for $CO_2$ removal, the hydrocarbon dewpoint temperature of the vapor steadily increases, and heavy liquid hydrocarbons can condense out if the dewpoint temperature exceeds the absorber operating temperature. This is illustrated in FIG. 7 by curves which illustrate dewpoint behavior in the absorber feed stream having a certain mol% $CO_2$ and which have been chilled to a temperature indicated and hydrocarbons condensed and removed. Thus, the legend "90 mol% $CO_2$ feed, 60° F. chiller" indicates a feed stream to the absorber containing 90 mol% $CO_2$ which has been chilled to the temperature indicated (60° F.) at or about 250 psia pressure. To avoid operating problems associated with the presence of liquid hydrocarbons in, for example, a TEA first absorber system, especially foaming and hydrocarbon loss in the $CO_2$ offgas from the stripper, it is highly desirable to operate with a temperature profile above the hydrocarbon dewpoint profile of the ascending vapor, i.e., the process stream, at all points in, for example, the TEA absorber.

Figure 8:
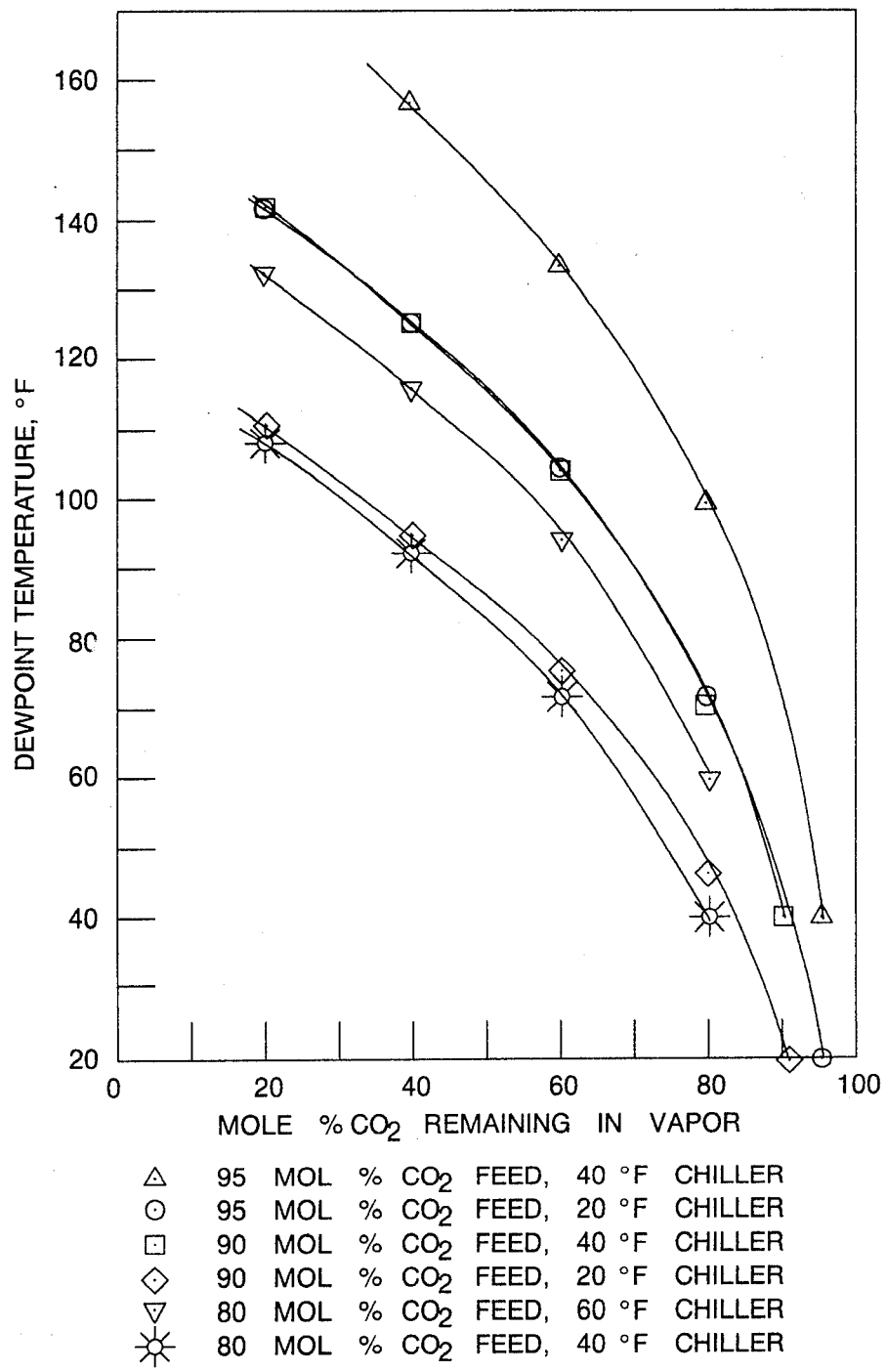
FIG. 8 represents graphically permeator dewpoint temperatures at 350 psia as a function of the $CO_2$ content of the gaseous stream being processed.

FIG. 8 (based on a modified Redlich-Kwong equation of state as set forth above with reference to FIG. 4) represents graphically permeator hydrocarbon dew point temperatures at 350 psia. The curves illustrate hydrocarbon dewpoint behavior in a permeator feed stream having a certain mol% $CO_2$ and which have been chilled to a temperature indicated and hydrocarbons condensed and removed. Thus, the legend "95 mol% $CO_2$, 40° F. chiller" indicates a feedstream to the permeator containing 95 mol% $CO_2$ which has been chilled to 40° F. at or about 350 psia. As $CO_2$ is removed by the permeator, the hydrocarbon dewpoint temperature steadily increases and heavy (especially $C_3$ and heavier) hydrocarbons can condense out if the dewpoint temperature exceeds the operating temperature of the permeator.

As indicated above, the temperature margin after chilling and hydrocarbon removal between the operating temperature of the permeator and the hydrocarbon dewpoint profile of the gas stream from which $CO_2$ has been removed is at least 10° F. and preferably in the range of about 15° F. to about 30° F. although of course even wider margins can be used.

Figure 9:
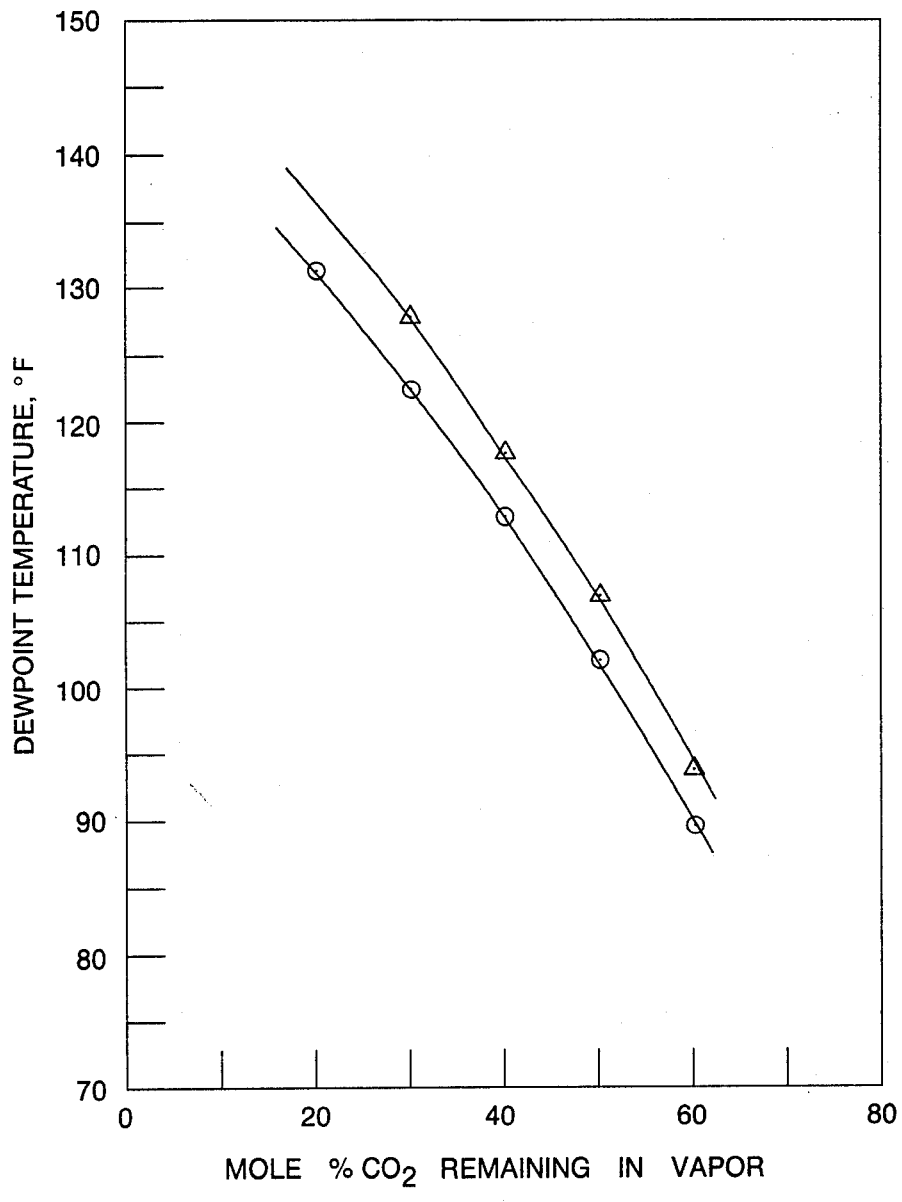
FIGS. 9 and 10 represent graphically absorber dewpoint temperatures of a TEA absorber at 330 psia and a DEA absorber at 310 psia operated in a permeation/-$CO_2$ absorption process according to the invention.
Figure 10:
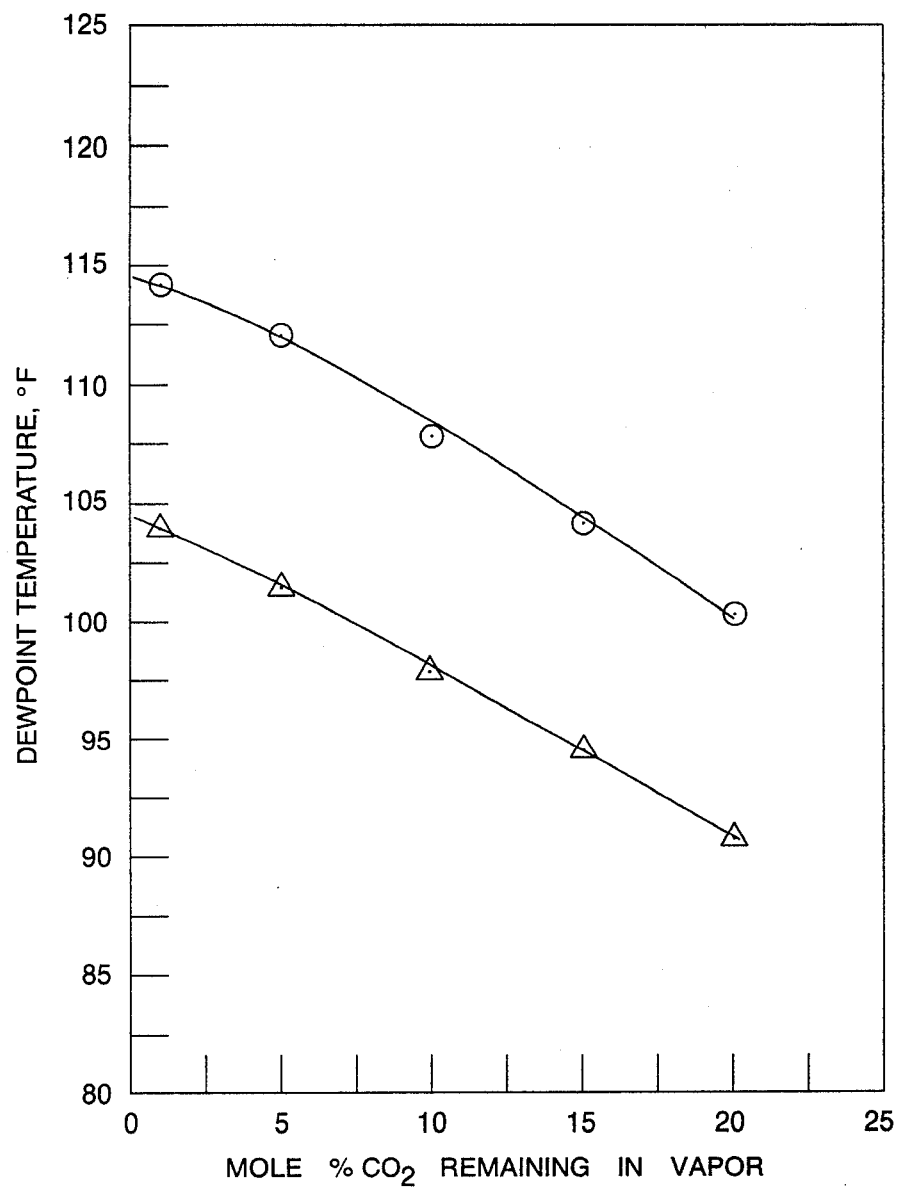

FIGS. 9 and 10 (based on a modified Redlich-Kwong Equation of State as set forth above in reference to FIG. 4) represent graphically TEA absorber and DEA absorber hydrocarbon dewpoint behavior, respectively, where the $CO_2$ removal system comprises a permeation zone at 350 psia, a second stage comprising a TEA absorber at 330 psia, and a third stage comprising a DEA absorber at 310 psia. Legends are as described above.

EXAMPLE

In accordance with the invention, as indicated, the gaseous stream is compressed and chilled to remove heavy hydrocarbons to prevent condensation or dropout of liquid hydrocarbons in the $CO_2$ removal process. The chilling temperature is set so that no condensation of hydrocarbons can occur as $CO_2$ is removed from the gaseous stream, at least during the immediately subsequent $CO_2$ removal stage. This is illustrated by FIGS. 8, 9 and 10, which show the variation in hydrocarbon dewpoint of several feedstreams at 350 psia in a permeator, and at 330 psia in a TEA absorber, and at 310 psia in a DEA absorber, respectively, as $CO_2$ is removed.

For example, consider the curve designated "80 mol% $CO_2$ feed, 60° F. chiller" in FIG. 8. This represents a feed gas with 80 mol% $CO_2$ which has been chilled to 60° F. at 355 psia with condensation and removal of heavy hydrocarbons. From FIG. 8, it can be seen that as the mol% $CO_2$ is reduced, for example by $CO_2$ removal from the stream in a permeator operating at 350 psia, the dew point inccreases from 60° F. at 80 mol% $CO_2$ to about 95° F. at 60 mol% $CO_2$ remaining in the feed gas. To avoid condensation of hydrocarbons on the permeator membranes which can cause a reduction in capacity and/or deterioration in the membrane itself, it is desirable to operate with a temperature profile within the permeator well above the hydrocarbon dewpoint temperature profile of the vapor during permeation. With, for example, the permeator maintained at about 105° F. at 350 psia, there would be a 10° F. margin above the dewpoint currently considered to be a minimum operating margin, in this case when 60 mol% $CO_2$ process gas is produced. Further cooling of the process gas to further remove heavy hydrocarbons may be required if, as discussed in greater detail below, subsequent removal of carbon dioxide is to be accomplished by further stages of permeation or chemical absorption solution processes.

Where the subsequent $CO_2$ removal process after the permeator is by chemical absorption using, for example, aqueous alkanolamine solutions, the gaseous feed stream may be chilled either before or after the permeation zone to a level effective for preventing hydrocarbon condensation or dropout during at least the immediately following $CO_2$ absorption stage.

For example, consider the curve designated "60 Mol% $CO_2$ Feed—90° F. Chiller" in FIG. 9. This curve represents an absorber feed gas with 60 mol% $CO_2$ content which has been chilled to 90° F. at 255 psia with condensation and removal of heavy hydrocarbons. FIG. 9 shows that as $CO_2$ is removed from this gas in, for example, a TEA absorber operating at 250 psia, the dewpoint increases, and, for example, at 20 mol% $CO_2$ the dewpoint is about 132° F. at 250 psia. To avoid operating problems associated with the presence of liquid hydrocarbons which, for example, in the TEA system, would cause foaming, it is highly desirable to operate with a temperature profile well above the dewpoint of the vapor. With, for example, the TEA absorber top tray maintained at 145° F. at 250 psia, there would be a greater than 10° F. margin above the dewpoint in this case when 20% $CO_2$ absorber offgas is produced. Note that if the TEA absorber is operated at a preferred temperature above 160° F., such as in the range of 160° F. to 180° F., no chiller is needed after the permeator to lower the dewpoint temperature.

Further cooling of the TEA absorber offgas can be required to prevent hydrocarbon dropout in, for example, a subsequent DEA absorber, which can be operated, for example, to produce an offgas with less than, for example, 2 mol% $CO_2$ with a top tray temperature normally about 125° F. For a DEA absorber operating at 125° F. at 310 psia to reduce $CO_2$ content of feed gas to that stage, FIG. 10 shows that for the illustrated stream chilling to 100° F. at about 315 psia is seen to be appropriate to provide about a 10° F. temperature margin for hydrocarbon control.

Figure 11:
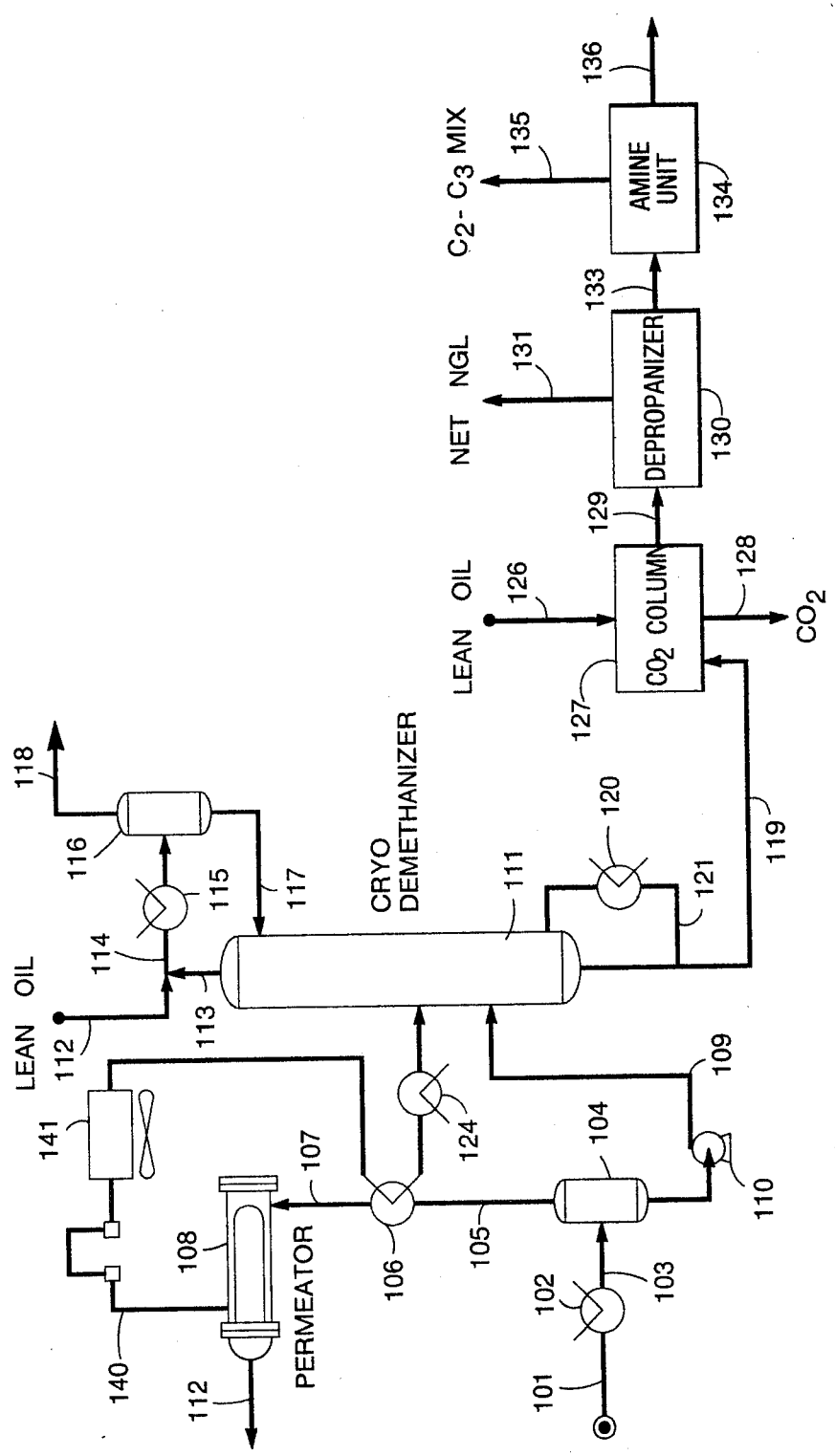
FIG. 11 represents schematically one embodiment of the invention.

Referring now to FIG. 11. FIG. 11 represents an integration in accordance with the invention of membrane permeators and cryogenic fractionation for $CO_2$ removal. In the discussion of FIG. 11 herein exemplary calculated material balance, compositions, and operating parameters are set forth to illustrate practicing the invention; however, it will be clear to those skilled in the art that many other embodiments in accordance with the invention can be utilized.

In the illustrated embodiment of FIG. 11 a feed stream 101 after drying is chilled in chiller 102 to produce chilled stream 103 to separator 104. For illustration purposes, stream 101 has the following composition:

|  | Mols/hr | Mol % |
|---|---|---|
| $N_2$ | 144 | |
| $CO_2$ | 6448 | 80 |
| $H_2S$ | 16 | |
| $C_1$ (methane) | 750 | |
| $C_2$ (ethane) | 310 | |
| $C_3$ (propane) | 253 | |
| $C_4+$ (Butane Plus) | 139 | |
| Total | 8060 | |

Separator 104 at about 300 psia and 0° F. separates a liquid fraction stream 109 which is pumped 110 to cryodemethanizer column 111. Vapor stream 105 from separator 104 is superheated in heat exchanger 106 in heat exchange relationship with hydrocarbon enriched process stream 140 from permeator 108 as hereinafter described to a temperature effective to prevent hydrocarbon condensation during passage of stream 107 through permeator 108.

As indicated above, an advantage of integrating membrane and cryogenic processes for $CO_2$ removal in accordance with the invention is that chilling of the feed stream 101 is necessary prior to entering cryodemethanizer column 111 so that treating of feed 101, for example, by chiller 102, to prevent hydrocarbon dropout or condensation in the permeator can be accomplished, in part, simultaneously. Removal of a significant proportion of the $CO_2$ in the permeator results in a further substantial reduction in the refrigeration duties in chilling the feed to the cryodemethanizer and $CO_2$. Similarly, the hydrocarbon enriched stream 140 can be cooled in heat exchange relationship with the vapor stream 105 to reheat the vapor stream to the permeation unit operating temperature.

Superheated stream 107, for example, at about 50° F. is provided to permeator 108 which in the illustrated embodiment produces a high purity $CO_2$ permeate stream 112 at 50 psia and a hydrocarbon enriched process stream 140 of reduced $CO_2$ content at 50° F.

The composition of permeate stream 112 is, for example, as follows:

|  | Mols/hr | Mol % |
|---|---|---|
| $N_2$ | 17 | |
| $CO_2$ | 5379 | 97.4 |
| $H_2S$ | 13 | |
| $C_1$ | 87 | |
| $C_2$ | 18 | |
| $C_3$ | 8 | |
| $C_4+$ | 2 | |
| Total | 5524; | | while the composition of hydrocarbon enriched process stream 140 is as follows:

|  | Mols/hr | Mol % |
|---|---|---|
| $N_2$ | 127 | |
| $CO_2$ | 825 | 38.3 |
| $H_2S$ | 2 | |
| $C_1$ | 657 | |
| $C_2$ | 277 | |
| $C_3$ | 202 | |
| $C_4+$ | 65 | |
| Total | 2155. | |

Process stream 140 is air cooled in exchanger 141 and further chilled in exchangers 106 and 124 and introduced into cryodemethanizer column 111 at a temperature in the range of $-15°$ F. to $-30°$ F. preferably at an intermediate level.

Liquid stream 109 from separator 104, having the following exemplary composition

|  | Mols/hr |
|---|---|
| $N_2$ | — |
| $CO_2$ | 244 |
| $H_2S$ | 1 |
| $C_1$ | 6 |
| $C_2$ | 15 |
| $C_3$ | 43 |
| $C_4+$ | 72 |
| Total | 381; | is introduced at an intermediate level to cryodemethanizer column 111.

Demethanizer column 111 can be a conventional bubble or valve tray type; alternatively, a packed column can be used. Lean oil stream 112 is introduced into the top of cryodemethanizer column 111 to facilitate reduction of the $CO_2$ content of the methane and lighter overhead gas to about 2 mol% or less without $CO_2$ freezeup. Overhead vapors (distillate) stream 113 from the top of column 111 are conducted through line 114 to chiller 115 where the vapors are partially condensed and the condensed liquid from separator 116 (having overhead line 118) is returned to column 111 through line 117.

The residue gas stream from separator 116 has the following exemplary composition

|  | Mol/hr | Mol % |
|---|---|---|
| $N_2$ | 127 | |
| $C_1$ | 658 | |
| $CO_2$ | 12 | 1.5 |
| Total | 797. | |

Liquid stream 119, which contains the bulk of the $CO_2$ plus $C_2$ and heavier hydrocarbons, from the bottom of column 111 passes through reboiler 120 via line 121 to maintain the temperature at the bottom of column 111 at a desired level and from cryodemethanizer column 111 to $CO_2$ column 128 preferably entering at an intermediate level.

Lean oil, preferably $C_4$–$C_5$ hydrocarbons, via line 126, is introduced into the top of $CO_2$ column 127 to facilitate separation of carbon dioxide from ethane. In addition, the lean oil enhances the volatility of $CO_2$ relative to $H_2S$ and column 127 thereby produces a sweet high purity carbon dioxide product stream 128. Ethane and other hydrocarbons together with lean oil exit from the bottom of $CO_2$ column 127 in stream 129 and are introduced into a depropanizer column 130 at an intermediate level. In the depropanizer butane and heavier hydrocarbons are separated as bottom stream 131. The vapor stream 133 from the top of depropanizer 130 is preferably subjected to conventional amine scrubbing in amine unit 134 and the acid gases $CO_2$ and $H_2S$ sent to sulfur recovery (not shown) by line 136. The sweet $C_2$–$C_3$ stream 135 from the amine unit 134 can be sold as an "E-P mix" or further fractionated.

From the foregoing it will be apparent to those skilled in the art that an efficient integrated membrane permeation-cryogenic fractionation process for removal of $CO_2$ from a process gas stream containing high levels of $CO_2$ has been described.

Figure 12:
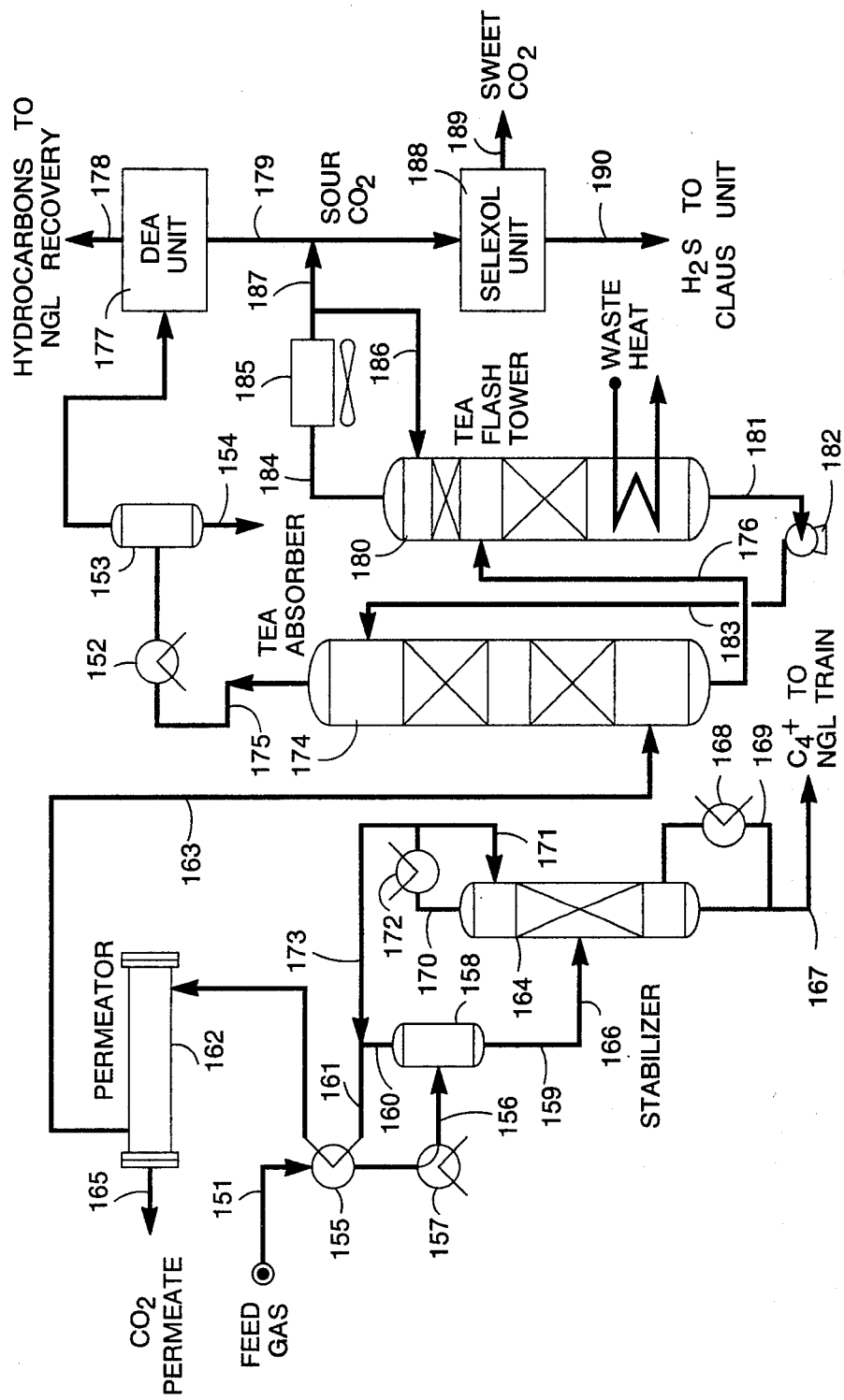
FIG. 12 represents schematically a second embodiment of the invention.

Referring now to FIG. 12, FIG. 12 represents schematically an integration in accordance with the invention of membrane permeators and chemical absorption for $CO_2$ removal. In the discussion of FIG. 12 herein exemplary material balances, compositions and operating parameters are set forth to illustrate practicing the invention; however, it will be clear to those skilled in the art that many other embodiments in accordance with the invention can be utilized.

In the illustrated embodiment of FIG. 12 a gaseous feed stream 151 having a composition, for example, as set forth below

|  | Mols/hr | Mol % |
|---|---|---|
| $N_2$ | 15 | |
| $CO_2$ | 6432 | 80.0 |
| $H_2S$ | 12 | |
| $C_1$ | 480 | |
| $C_2$ | 286 | |
| $C_3$ | 288 | |
| $C_4$ | 224 | |
| $C_5+$ | 278 | |
| Total | 8015 | | at 335 psia is chilled in exchanger 155 and chiller 157 operated at 355 psia and 60° F. to remove heavy hydrocarbons in sufficient amount such that the vapor passing through the permeator unit has a hydrocarbon dewpoint above the operating temperature of the permeator. Chilled compressed stream 156 is sent to chiller flash drum 158. A material balance across the flash drum 158 is, for example, as follows:

|  | Stream 159 Liquid | | Stream 160 Vapor | |
|---|---|---|---|---|
|  | Mols/hr | Mol % | Mols/hr | Mol % |
| $N_2$ | — | | 15 | |
| $CO_2$ | 151 | 31.8 | 6281 | 83.3 |
| $H_2S$ | 1 | | 11 | |
| $C_1$ | 4 | | 476 | |
| $C_2$ | 13 | | 273 | |
| $C_3$ | 39 | | 249 | |
| $C_4$ | 70 | | 154 | |
| $C_5+$ | 197 | | 81 | |
| Total | 475 | | 7450 | |

Hydrocarbon liquid stream 159 from chiller flash drum 158 is sent by line 166 to stabilizer column 164 where $H_2S$, $CO_2$ and propane and lighter hydrocarbons are taken overhead in stream 170, chilled in chiller 172, and liquids refluxed via line 171 to the top of stabilizer column 164. $C_3$ and lighter hydrocarbons together with $H_2S$ and $CO_2$ are combined by line 173 with vapor stream 160 from chiller flash drum 158 and combined stream 161 is superheated in exchanger 155 to 110° F. at 350 psia and sent to the permeator unit 162.

The butane and heavier bottom streams from stabilizer 164 is taken, for example, to a natural gas liquids train via line 167. A portion of the bottom is used for temperature control of the stabilizer column 164 via line 169 and exchanger 168.

Permeator unit 162 separates combined stream 161 into a high purity $CO_2$ stream 165. The material balance across permeator 162 is, for example, as follows:

|  | Stream 161 Feed | | Stream 163 Process | | Stream 165 Permeate | |
| --- | --- | --- | --- | --- | --- | --- |
|  | Mols/hr | Mol % | Mols/hr | Mol % | Mols/hr | Mol % |
| $N_2$ | 15 |  | 14 |  | 1 |  |
| $CO_2$ | 6442 | 81.2 | 1803 | 55.8 | 4639 | 98.7 |
| $H_2S$ | 12 |  | 6 |  | 6 |  |
| $C_1$ | 47 |  | 451 |  | 36 |  |
| $C_2$ | 304 |  | 292 |  | 12 |  |
| $C_3$ | 336 |  | 332 |  | 4 |  |
| $C_4$ | 209 |  | 207 |  | 2 |  |
| $C_5+$ | 130 |  | 129 |  | 1 |  |
| Total | 7935 |  | 3234 |  | 4701 |  |

Hydrocarbon enriched process stream 163 is introduced into TEA absorber 174, having a bottom pressure of 335 psia and contacted with 40 wt% lean TEA from TEA Flash Tower 180 via line 183 by pump 182 to the top of TEA absorber 174.

In the illustrated embodiment of FIG. 12, the permeator 162 is designed to yield a hydrocarbon enriched process stream 163 with about 56 mol% $CO_2$ to be sent to TEA absorber 174. The TEA absorber 174 is designed to remove $CO_2$ from its feed to yield an overhead vapor stream 175 containing about 20 mol% $CO_2$ at 160° F. and 330 psia.

Overhead vapor stream 175 is sent to DEA unit 177 after interstage chilling in chiller 152 to 100° F. and hydrocarbon separation in separator 153 to prevent hydrocarbon condensation in the DEA unit 177. The material balance across the DEA treater comprising chiller 152 and separator 153 is as follows:

|  | Stream 175 Feed | | Separator 153 Vapor | | Separator 153 Liquid in line 154 | |
| --- | --- | --- | --- | --- | --- | --- |
|  | Mols/hr | Mol % | Mols/hr | Mol % | Mols/hr | Mol % |
| $N_2$ | 12 |  | 12 |  | — |  |
| $CO_2$ | 304 | 19.0 | 294 | 20.7 | 10 | 5.3 |
| $H_2S$ | 2 |  | 2 |  | — |  |
| $C_1$ | 436 |  | 429 |  | 7 |  |
| $C_2$ | 287 |  | 269 |  | 18 |  |
| $C_3$ | 331 |  | 283 |  | 48 |  |
| $C_4$ | 152 |  | 97 |  | 55 |  |
| $C_5+$ | 80 |  | 31 |  | 49 |  |
| Total | 1604 |  | 1417 |  | 187 |  |

DEA unit 177 is functional for removal of most all of the remaining $CO_2$ to produce a lean sweet hydrocarbon stream 178 which can be further processed for NGL recovery and an acid gas stream 179 which can be sent to selective stripper 188 for selective separation of $CO_2$ $H_2S$.

TEA flash tower 180 having a bottom pressure of about 30 psia strips $CO_2$ and $H_2S$ from rich TEA stream 176 introduced into the top of TEA stripper 180 to produce a sour gas overhead stream 184 and lean TEA stream 181 which is recirculated to TEA absorber 174 by pump 182 and line 183.

Sour gas overhead stream 184 can be air cooled 185 and liquids returned to the top of TEA flash tower 180 via line 186 to produce sour $CO_2$ stream 187.

When $H_2S$ is present, selective sweetening of sour $CO_2$ stream 187 may be required, for example, using a selective sweetening process such as, for example, SELEXOL process 188, available from Allied Chemicals, Inc., to produce sweet $CO_2$ stream 189, having, for example, less than 100 ppm $H_2S$, suitable for pipelining and/or reinjection for $CO_2$ miscible flooding and an $H_2S$ stream 190 which can be sent, for example, to a Claus type sulfur recovery unit (not shown).

Although the invention has been described as required in terms of exemplary and preferred embodiments, the invention is not limited thereto but by the claims hereto appended.

What is claimed is:

1. Process for treating a gaseous stream comprising hydrocarbons and $CO_2$ comprising
   (a) separating a portion of hydrocarbons from the gaseous stream to produce a first stream;
   (b) separating $CO_2$ from the first stream in a first $CO_2$ absorption zone by absorption in a first solution effective for $CO_2$ removal to produce a hydrocarbon enriched second stream;
   (c) further separating $CO_2$ from the second stream in at least a second $CO_2$ absorption zone by absorption in a second solution effective for $CO_2$ removal to produce a further hydrocarbon enriched third stream,
   wherein the gaseous stream comprises $CO_2$ and hydrocarbons such that in the absence of step (a) hydrocarbon condensation due to hydrocarbon dewpoint temperature increase occurs as $CO_2$ is removed in at least one of steps (b) and (c), and
   wherein the first solution comprises an aqueous tertiary alkanolamine solution; and
   the second solution comprises an aqueous alkanolamine solution selected from the group consisting of aqueous secondary alkanolamine solutions and aqueous primary alkanolamine solutions.

2. Process as in claim 1 wherein
   the gaseous stream comprises in excess of about 20 mol% $CO_2$ and $C_3$ and heavier hydrocarbons such that in the absence of step (a) of claim 1 hydrocarbon condensation occurs in at least one of steps (b) and (c) of claim 1.

3. Process as in claim 2 wherein
   the separating of step (a) to claim 1 is by chilling the gaseous stream to a temperature so that the hydrocarbon dewpoint temperature profile during $CO_2$ absorption is at least less than the temperature of one of the hydrocarbon enriched second stream and the further hydrocarbon enriched third stream.

4. Process as in claim 3 wherein
   the gaseous stream is chilled to a temperature so that the hydrocarbon dewpoint temperature profile during $CO_2$ absorption is at least 10° F. less than the temperature of said at least one of the hydrocarbon enriched second stream and the further hydrocarbon enriched third stream.

5. Process as in claim 3 wherein
   the first solution comprises an aqueous triethanolamine (TEA) solution; and
   the second solution comprises an aqueous diethanolamine (DEA) solution.

6. Process as in claim 3 wherein the gaseous stream comprises in the range of about 30 mol% $CO_2$ to about 95 mol% $CO_2$.

7. Process as in claim 3 wherein
the gaseous stream comprises in the range of about 30 mol% $CO_2$ to about 60 mol% $CO_2$.

8. Process as in claim 3 wherein
the gaseous stream is a gaseous stream from a $CO_2$ miscible flood produced reservoir and is characterized by containing greater than about 30 mol% $CO_2$ and by a variable $C_3$ and heavier hydrocarbon composition.

9. Process as in claim 8 wherein
the gaseous stream is further characterized by a generally increasing $C_4$ and heavier hydrocarbon fraction as a function of increased $CO_2$ content in the gaseous stream from the $CO_2$ miscible flood produced reservoir.

10. Process as in claim 1 wherein
the gaseous stream further comprises $H_2S$;
the first $CO_2$ absorption zone and the second $CO_2$ absorption zone are effective for separation of $CO_2$ and $H_2S$ to produce an acid gas stream comprising $CO_2$ and $H_2S$; and
the acid gas stream is introduced into a third $CO_2$ absorption zone to produce a $CO_2$ stream substantially free of $H_2S$.

11. Process for treating a gaseous stream comprising
(a) separating at least a first portion of hydrocarbons from the gaseous stream to produce a first stream having a reduced hydrocarbon content;
(b) separating $CO_2$ from the first stream in a first $CO_2$ absorption zone by absorption in a first solution effective for $CO_2$ removal to produce a hydrocarbon enriched second stream;
(c) subsequently separating a second portion of hydrocarbons from the second stream to produce a third stream having a further reduced hydrocarbon content; and
(d) further separating $CO_2$ from the third stream in at least a second $CO_2$ absorption zone by absorption in a second solution effective for $CO_2$ removal to produce a further hydrocarbon enriched fourth stream; and wherein
the separation of step (a) is effective for preventing hydrocarbon condensation due to hydrocarbon dewpoint temperature increase during $CO_2$ removal in at least the first $CO_2$ absorption zone, and
the separation of step (c) is effective for preventing hydrocarbon condensation due to hydrocarbon dewpoint temperature increase during $CO_2$ removal in said at least a second $CO_2$ absorption zone, and wherein
the gaseous stream comprises $CO_2$ and hydrocarbons such that in the absence of steps (a) and (c) hydrocarbon condensation due to hydrocarbon dewpoint increase occurs as $CO_2$ is removed, and wherein
the first solution comprises an aqueous tertiary alkanolamine solution; and
the second solution comprises an aqueous alkanolamine solution selected from the group consisting of aqueous secondary alkanolamine solutions and aqueous primary alkanolamine solutions.

12. Process as in claim 11 wherein
the gaseous stream comprises in excess of about 20 mol% $CO_2$ and $C_3$ and heavier hydrocarbons such that in the absence of steps (a) and (c) hydrocarbon condensation occurs in steps (b) and (d) respectively during $CO_2$ separation.

13. Process as in claim 12 wherein
The separating of step (a) is by chilling the gaseous stream so that the hydrocarbon dewpoint temperature profile during $CO_2$ absorption is less than the temperature of the thus produced hydrocarbon enriched second stream; and
the separating of step (c) is by chilling the hydrocarbon enriched second stream so that the hydrocarbon dewpoint temperature profile during $CO_2$ absorption is less than the temperature of the thus produced hydrocarbon enriched fourth stream.

14. Process as in claim 13 wherein
the gaseous stream is chilled to a temperature so that the hydrocarbon dewpoint temperature profile during $CO_2$ absorption is at least 10° F. less than the temperature of the thus produced hydrocarbon enriched second stream; and
the hydrocarbon enriched second stream is chilled to a temperature so that the hydrocarbon dewpoint temperature profile during absorption is at least 10° F. less than the temperature of the thus produced hydrocarbon enriched fourth stream.

15. Process as in claim 12 wherein
the first solution comprises an aqueous triethanolamine (TEA) solution; and
the second solution comprises an aqueous diethanolamine solution.

16. Process as in claim 12 wherein
the gaseous stream comprises in the range of about 30 mol% $CO_2$ to about 95 mol% $CO_2$.

17. Process as in claim 12 wherein
the gaseous stream comprises in the range of about 30 mol% $CO_2$ to about 60 mol% $CO_2$.

18. Process as in claim 12 wherein
the gaseous stream is a gaseous stream from a $CO_2$ miscible flood produced reservoir and is characterized by containing greater than about 30 mol% $CO_2$ and by a variable $C_3$ and heavier hydrocarbon composition.

19. Process as in claim 18 wherein
the gaseous stream is further characterized by a generally increasing $C_4$ and heavier hydrocarbon fraction as a function of increased $CO_2$ content in the gaseous stream from the $CO_2$ miscible flood produced reservoir.

20. Process as in claim 11 wherein
the gaseous stream further comprises $H_2S$;
the first $CO_2$ absorption zone and the second $CO_2$ absorption zone are effective for separation of $CO_2$ and $H_2S$ to produce an acid gas stream comprising $CO_2$ and $H_2S$; and
the acid gas stream is introduced into a third $CO_2$ absorption zone to produce a $CO_2$ stream substantially free of $H_2S$.

21. Process for treating a gaseous stream comprising hydrocarbons and $CO_2$, the process comprising:
(a) separating a first portion of $CO_2$ from the gaseous stream in a permeation zone by selective permeation of $CO_2$ across a differentially permeable membrane to produce a $CO_2$ permeate and a hydrocarbon enriched first stream; and
(b) further separating $CO_2$ from the hydrocarbon enriched first stream in at least one $CO_2$ absorption zone by absorption utilizing an aqueous alkanolamine solution effective for $CO_2$ removal to produce a further hydrocarbon enriched process stream, and wherein the gaseous stream comprises hydrocarbons including $C_3$ and heavier hydrocarbons such that hydrocarbon condensation occurs during separation of $CO_2$ unless the gaseous stream is treated to remove at least a portion of the hydrocarbons, the process thus further comprising:

separating a portion of hydrocarbons from the gaseous stream such that hydrocarbon condensation does not occur due to hydrocarbon dewpoint increase as $CO_2$ is removed during step (a); and subsequently separating a further portion of hydrocarbons from the hydrocarbon enriched first stream such that hydrocarbon condensation does not occur due to hydrocarbon dewpoint increase as $CO_2$ is removed during step (b).

22. Process as in claim 21 wherein
said at least one $CO_2$ absorption zone of step (b) of claim 21 comprises at least two $CO_2$ absorption zones; and wherein the gaseous stream comprises hydrocarbons including $C_3$ and heavier hydrocarbons such that hydrocarbon condensation occurs during absorption of $CO_2$ unless the stream is treated to remove at least a portion of the hydrocarbons, the process further comprising:

separating a first portion of hydrocarbons from the gaseous stream prior to separating $CO_2$ in accordance with step (a) of claim 21 such that hydrocarbon condensation does not occur during step (a);

separating $CO_2$ from the hydrocarbon enriched first stream in a first $CO_2$ absorption zone by absorption in a first solution effective for $CO_2$ removal to produce a second stream; and separating a second portion of hydrocarbons from the second stream to produce a third stream having reduced hydrocarbon content;

further separating $CO_2$ from the third stream in at least a second $CO_2$ absorption zone by absorption in a second solution effective for $CO_2$ removal to produce a further hydrocarbon enriched fourth stream; and wherein the step of separating a second portion of hydrocarbons from the second stream is effective to prevent hydrocarbon condensation during $CO_2$ separation in said at least a second $CO_2$ absorption zone.

23. Process as in claim 22 wherein
the first solution comprises an aqueous tertiary alkanolamine solution; and the second solution comprises an aqueous alkanolamine solution selected from the group consisting of aqueous secondary alkanolamine solutions and aqueous primary alkanolamine solutions.

24. Process as in claim 21 wherein
said at least one $CO_2$ absorption zone comprises at least two $CO_2$ absorption zones; and wherein the step of subsequently removing a further portion of hydrocarbons from the hydrocarbon enriched first stream such that hydrocarbon condensation does not occur during step (b) of claim 21 occurs prior to at least one of said at least two $CO_2$ absorption zones.

25. Process as in claim 21 wherein
the gaseous stream comprises in the range of 30 mol% $CO_2$ to 95 mol% $CO_2$.

26. Process as in claim 25 wherein
the gaseous stream comprises in the range of about 60 mol% $CO_2$ to about 95 mol% $CO_2$.

27. Process as in claim 21 wherein the $CO_2$ absorption zone comprises at least a first $CO_2$ absorption zone and a second $CO_2$ absorption zone and step (b) of claim 21 further comprises:

(1) separating $CO_2$ from the first stream in the first $CO_2$ absorption zone by absorption in a first solution effective for $CO_2$ removal to produce a hydrocarbon enriched second stream;

(2) further separating $CO_2$ from the second stream in at least a second $CO_2$ absorption zone by absorption in a second solution effective for $CO_2$ removal to produce a further hydrocarbon enriched third stream.

28. Process as in claim 27 wherein
the first solution has a lower reactivity towards $CO_2$ and lower energy requirements for regeneration than the second solution.

29. Process as in claim 28 wherein
the first solution comprises an aqueous tertiary alkanolamine solution; and the second solution is selected from the group consisting of aqueous secondary alkanolamine solutions and aqueous primary alkanolamine solutions.

30. Process as in claim 28 wherein
the first solution comprises an aqueous triethanolamine (TEA) solution; and the second solution comprises an aqueous diethanolamine (DEA) solution.

31. Process as in claim 21 wherein
said at least one $CO_2$ absorption zone comprises at least a first $CO_2$ absorption zone and a second $CO_2$ absorption zone; and wherein the step of subsequently removing a further portion of hydrocarbons from the hydrocarbon enriched first stream such that hydrocarbon condensation does not occur during step (b) of claim 21 occurs prior to at least one of said first $CO_2$ absorption zone and said second $CO_2$ absorption zone, step (b) of claim 21 further comprising:

(1) separating $CO_2$ from the first stream in the first $CO_2$ absorption zone by absorption in a first solution effective for $CO_2$ removal to produce a hydrocarbon enriched second stream;

(2) further separating $CO_2$ from the second stream in at least a second $CO_2$ absorption zone by absorption in a second solution effective for $CO_2$ removal to produce a further hydrocarbon enriched third stream, and wherein the first solution comprises an aqueous tertiary alkanolamine solution; and the second solution comprises an aqueous alkanolamine solution selected from the group consisting of aqueous secondary alkanolamine solutions and aqueous primary alkanolamine solutions.

32. Process as in claim 31 wherein
the first solution comprises an aqueous triethanolamine (TEA) solution; and the second solution comprises an aqueous diethanolamine (DEA) solution.

33. Process as in claim 21 wherein
the gaseous stream is a gaseous stream from a $CO_2$ miscible flood produced reservoir and is characterized by containing greater than about 30 mol% $CO_2$ and by a variable $C_3$ and heavier hydrocarbon composition.

34. Process as in claim 21 wherein
the gaseous stream is further characterized by a generally increasing $C_4$ and heavier hydrocarbon fraction as a function of increased $CO_2$ content in the gaseous stream from the $CO_2$ miscible flood produced reservoir.

35. Process as in claim 3 wherein:
the first solution comprises an aqueous methyldiethanolamine (MDEA) solution; and
the second solution comprises an aqueous diethanolamine (DEA) solution.

36. Process for treating a gaseous steam as in claim 1 wherein step (c) further comprises:
separating a second portion of hydrocarbons from the second stream prior to further separating $CO_2$ from the second stream to produce the third stream.

37. Process as in claim 12 wherein:
the first solution comprises an aqueous methyldiethanolamine (MDEA) solution; and
the second solution comprises an aqueous diethanolamine (DEA) solution.

38. Process as in claim 28 wherein:
the first solution comprises an aqueous methyldiethanolamine (MDEA) solution; and
the second solution is an aqueous diethanolamine (DEA) solution.

39. Process as in claim 31 wherein:
the first solution comprises an aqueous methyldiethanolamine (MDEA) solution; and
the second solution comprises an aqueous diethanolamine (DEA) solution.

* * * * *